United States Patent
Lamon et al.

(10) Patent No.: US 6,565,969 B1
(45) Date of Patent: May 20, 2003

(54) ADHESIVE ARTICLE

(75) Inventors: Alain Henri Lamon, Le Pecq (FR); Susan C. Noe, St. Paul, MN (US); Dieter Jung, Moers (DE); Juergen Klingen, Schwalmtal (DE); Jörg von Seggern, Langenfeld (DE); Jadwiga Walhoefer, Neuss (DE); Stefan Weigl, Neuss (DE); Robert E. Bolitsky, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/422,610

(22) Filed: Oct. 21, 1999

(51) Int. Cl.$^7$ .................................................. B32B 7/12
(52) U.S. Cl. ...................... 428/349; 428/347; 428/195; 428/200; 428/355 EP; 428/356
(58) Field of Search ................................ 428/195, 200, 428/347, 349, 355 EP, 356

(56) References Cited

U.S. PATENT DOCUMENTS

| | | | |
|---|---|---|---|
| 1,960,176 A | 5/1934 | Weber et al. | 91/68 |
| 2,736,721 A | 2/1956 | Dexter | 260/42 |
| 2,814,601 A | 11/1957 | Currie et al. | 260/29.1 |
| 2,857,356 A | 10/1958 | Goodwin | 260/42 |
| 2,987,420 A | 6/1961 | Bemmells | 117/122 |

(List continued on next page.)

FOREIGN PATENT DOCUMENTS

| | | |
|---|---|---|
| EP | 0 040 079 | 11/1981 |
| EP | 0 268 985 | 6/1988 |
| EP | 0 306 161 | 3/1989 |
| EP | 0 306 162 | 3/1989 |
| EP | 0 355 991 | 2/1990 |
| EP | 0 393 426 | 10/1990 |
| EP | 0 435 173 | 7/1991 |
| EP | 0 942 054 | 9/1999 |
| EP | 1 078 965 | 2/2001 |
| GB | 998232 | 7/1965 |
| JP | 3-14888 | 1/1991 |
| JP | 8-188749 | 7/1996 |
| WO | WO 93/23472 | 11/1993 |
| WO | WO 96/23915 | 8/1996 |
| WO | WO 98/21287 | 5/1998 |
| WO | WO 98/29516 | 7/1998 |
| WO | WO 98/30645 | 7/1998 |
| WO | WO 98/38262 | 9/1998 |

OTHER PUBLICATIONS

The Handbook of Pressure–Sensitive Adhesive Technology, (Satas, 1982), pp. 348–349.
E.A. Grulke in Polymer Handbook: 3$^{rd}$ Edition, J. Brandrup, E.H. Immergut, and E.A. Grulke, Editors, John Wiley and Sons, 1999, Section VII.
Fedors, Polym. Eng. and Sci., vol. 14, No. 2 (1974), 147–154.
Donatas Satas, "Handbook of Pressure Sensitive Adhesive Technology", 2$^{nd}$ Edition, Van Nostrand Rheinhold, New York (1989), pp. 173–176.
L.H. Sperling, "Introduction to Physical Polymer Science", 2$^{nd}$ Edition, John Wiley & Sons, New York, p. 357 (1992).
T.G. Fox, Bull. Am. Phys. Soc., 1, 123 (1956).
A. V. Pocius, "Adhesion and Adhesives Technology," Hanser/Gardner 1997, p. 183.
*Encyclopedia of Polymer Science and Engineering*, vol. 11, John Wiley & Sons, Inc. (New York, 1988), pp. 45–92.
Alphonsus V. Pocius, *Adhesion and Adhesives Technology: An Introduction*, Hanser Publishers (New York, 1997), pp. 185–188 and 200–202.
Advances in Chemistry Series 208, "Rubber–Modified Thermoset Resins" edited by C. K. Riew and J. K. Gillham, American Chemical Society, Washington, 1984.
"Handbook of Pressure Sensitive Adhesive Technology", Donatas Satas (Ed.), 2$^{nd}$ Edition, pp. 171–172, Van Nostrand Reinhold, New York, NY, 1989.
"Glossary of Terms Used in the Pressure Sensitive Tape Industry", *Test Methods for Pressure Sensitive Adhesive Tapes*, Pressure Sensitive Tape Council, Aug., 1996.
Handbook of Pressure Sensitive Adhesive Technology, 2$^{nd}$ Edition, D. Satas, Ed. Van Nostrand Reinhold, New York, 1989, Chapter 17, pp. 494–507.
Handbook of Pressure Sensitive Adhesive Technology, 2$^{nd}$ Edition, D. Satas, Ed. Van Nostrand Reinhold, New York, 1989, Chapter 18, pp. 508–517.
The Handbook of Pressure–Sensitive Adhesive Technology (Satas, 1982), pp. 344–346.
"Superfine Thermoplastic Fibers" by Wente in *Industrial Engineering Chemistry*, vol. 48, pp. 1342–1346 (1956).
"Surface Coatings: Science and Technology" by S. Paul, 1985, p. 485.
"Progress in Rubber and Plastics Technology", edited by Dr. S.H. Morrell, vol. 1, No. 4, Oct. 1985.
"Treatise on Adhesion and Adhesives", edited by J. Dean Minford, vol. 7, 1991.
"Polyurethanes Chemistry and Technology" Part I, by J.H. Saunders and K.C. Frisch, vol. XVI, Part 1, 1962.

*Primary Examiner*—James J. Seidleck
*Assistant Examiner*—Melanie Bissett
(74) *Attorney, Agent, or Firm*—Daniel R. Pastirik

(57) ABSTRACT

The present invention relates to an adhesive article comprising a bondable layer having on at least one major surface a layer of pressure sensitive adhesive, wherein the bondable layer comprises a thermosetting material, a thermoplastic material, or a hybrid material, wherein the pressure sensitive adhesive layer substantially retains pressure sensitive adhesive characteristics after storage at room temperature for at least about three months prior to bonding the adhesive article, and the adhesive article has a overlap shear measured at room temperature according to ASTM D-1002-94 of at least about 6.9 MPa after bonding as well as a method for making an adhesive article.

8 Claims, No Drawings

U.S. PATENT DOCUMENTS

| | | | |
|---|---|---|---|
| 3,050,505 A | 8/1962 | Litterio | |
| 3,338,992 A | 8/1967 | Kinney | 264/24 |
| 3,502,763 A | 3/1970 | Hartmann | 264/210 |
| 3,527,842 A | 9/1970 | Clark | 260/825 |
| 3,528,940 A | 9/1970 | Modic | 260/37 |
| 3,562,223 A | 2/1971 | Bargain et al. | 260/78 |
| 3,595,900 A | 7/1971 | Loudas et al. | 260/453 |
| 3,627,780 A | 12/1971 | Bonnardi et al. | 260/326.3 |
| 3,692,618 A | 9/1972 | Dorschner et al. | 161/72 |
| 3,725,504 A | 4/1973 | Owston | |
| 3,733,349 A | 5/1973 | Loudas et al. | 260/453 |
| 3,832,274 A | 8/1974 | Owston | |
| 3,833,683 A | 9/1974 | Dickie et al. | 260/836 |
| 3,839,358 A | 10/1974 | Bargain et al. | 260/326.26 |
| 3,856,883 A | 12/1974 | Dickie | 260/836 |
| 3,864,426 A | 2/1975 | Salensky | 260/837 R |
| 3,873,640 A | 3/1975 | Owston et al. | |
| 3,881,041 A | 4/1975 | Glienke | |
| 3,894,112 A | 7/1975 | Pagel | 260/830 R |
| 3,959,568 A | 5/1976 | Hill, Jr. et al. | |
| 3,962,184 A | 6/1976 | Notomi et al. | 260/47 |
| 3,983,298 A | 9/1976 | Hahn et al. | 428/355 |
| 4,022,755 A | 5/1977 | Tanigaichi et al. | 260/59 R |
| 4,026,913 A | 5/1977 | Tanigaichi et al. | 260/463 |
| 4,039,707 A | 8/1977 | O'Malley | 428/40 |
| 4,051,087 A * | 9/1977 | Scoggins et al. | 428/475.5 |
| 4,054,596 A * | 10/1977 | Koshar et al. | 560/150 |
| 4,107,116 A | 8/1978 | Riew et al. | 260/23 |
| 4,116,946 A | 9/1978 | Jakob et al. | 528/172 |
| 4,195,132 A | 3/1980 | Sundermann et al. | 521/155 |
| 4,309,520 A | 1/1982 | Blizzard | 525/477 |
| 4,405,297 A | 9/1983 | Appel et al. | 425/72 |
| 4,468,497 A | 8/1984 | Street et al. | 525/422 |
| 4,503,211 A | 3/1985 | Robins | 528/92 |
| 4,528,366 A | 7/1985 | Woo et al. | 528/422 |
| 4,693,776 A | 9/1987 | Krampe et al. | 156/327 |
| 4,709,008 A | 11/1987 | Shimp | 528/422 |
| 4,751,138 A | 6/1988 | Tumey et al. | 428/323 |
| 4,774,297 A | 9/1988 | Murakami et al. | 525/478 |
| 4,868,288 A | 9/1989 | Meier | 534/15 |
| 4,908,273 A | 3/1990 | Urech et al. | 428/413 |
| 4,925,671 A | 5/1990 | Abber | 424/448 |
| 4,985,340 A | 1/1991 | Palazzotto et al. | 430/270 |
| 5,086,088 A | 2/1992 | Kitano et al. | 522/170 |
| 5,112,882 A | 5/1992 | Babu et al. | 522/158 |
| 5,176,952 A | 1/1993 | Joseph et al. | 428/284 |
| 5,232,770 A | 8/1993 | Joseph | 428/284 |
| 5,238,773 A | 8/1993 | Joseph et al. | 428/284 |
| 5,248,455 A | 9/1993 | Joseph et al. | 264/6 |
| 5,258,220 A | 11/1993 | Joseph | 428/284 |
| 5,494,981 A | 2/1996 | Gorodisher et al. | 525/504 |
| 5,593,759 A | 1/1997 | Vargas et al. | 428/200 |
| 5,684,102 A | 11/1997 | Pocius et al. | |
| 5,690,780 A | 11/1997 | Zharov et al. | |
| 5,691,065 A | 11/1997 | Zharov et al. | |
| 5,709,948 A | 1/1998 | Perez et al. | 428/413 |
| 5,716,687 A * | 2/1998 | Chumbley et al. | 400/637.3 |
| 5,795,657 A | 8/1998 | Pocius et al. | |
| 5,859,160 A | 1/1999 | Righettini et al. | |

* cited by examiner

ADHESIVE ARTICLE

FIELD OF THE INVENTION

The invention relates to an adhesive article having a pressure sensitive adhesive layer and a bondable layer as well as to an assembly comprising the adhesive article.

BACKGROUND OF THE INVENTION

The individual benefits of pressure sensitive adhesives and other types of adhesives, including structural adhesives, are well known. There are also applications where two types of adhesives have been combined to realize the benefit of both types of adhesives.

U.S. Pat. No. 5,593,759 discloses a pressure sensitive structural adhesive material comprising a core layer of a thermally curable structural adhesive providing opposed surfaces having on at least one surface thereof a separate continuous or discontinuous layer of a tacky pressure sensitive adhesive, the pressure sensitive adhesive being absorbed into the core layer upon curing.

Japanese Kokai Patent No. 3-14888 discloses a heat curable tacky adhesive sheet with a heat curing area and pressure sensitive adhesive area on the same face of the sheet, in which both the heat curing area and the pressure sensitive area are continuous through the thickness of the film or are both coated, side-by-side, on a supporting film.

U.S. Pat. No. 4,908,273 discloses a multilayer, heat curable adhesive film having a tacky external heat curable layer and a dry external heat curable layer, containing adducts which contain epoxide groups.

EP 942054 discloses an assembly comprising two substrates bonded together by an adhesive system comprising at least one pressure sensitive adhesive layer and at least one cured structural hybrid adhesive layer wherein at least one of the pressure sensitive adhesive layers is essentially continuous and extends essentially over the full width of the bonded area.

U.S. Pat. No. 5,086,088 discloses a pressure-sensitive thermosetting adhesive comprising a blend of an acrylic ester and an epoxy resin.

The industry continues to seek adhesive articles having a combination of benefits of different types of adhesives, for example, both pressure sensitive adhesive and structural adhesive characteristics.

In addition, the industry continues to seek adhesive articles that simultaneously afford excellent shelf stability, including retention of pressure sensitive adhesive characteristics, for example, tack, and excellent adhesive properties over a wide temperature range after bonding, including preferably retention of lap shear and peel strength at elevated temperature, good impact strength at room temperature and at lower temperatures, for example, −40° C., resistance to creep under load, and ability to retain properties after environmental exposure. The industry also seek adhesive articles having a lack of sensitivity to moisture exposure during storage.

SUMMARY OF THE INVENTION

The present invention relates to an adhesive article comprising a bondable layer and a pressure sensitive adhesive layer on at least one major surface of the bondable layer, as well as an assembly comprising one or more substrates and the adhesive article.

The adhesive article of the present invention may have one or more features as described herein.

For example, a pressure sensitive adhesive layer may be continuous over at least one major surface of the bondable layer or a pressure sensitive layer may be discontinuous over at least one major surface of the bondable layer. A pressure sensitive adhesive layer preferably retains its pressure sensitive adhesive characteristics, as described herein.

A bondable layer may be a thermosetting material, a thermoplastic material, or a hybrid material as defined below. A thermosetting or hybrid bondable layer, when tested alone after bonding, may have an overlap shear strength as tested in accordance with ASTM D-1002-94, at room temperature (approximately 23° C.±3° C.) of at least about 6.9 MegaPascals ("MPa"), and preferably at a temperature from room temperature up to and including about 80° C. of at least about 6.9 MPa.

An adhesive article of the present invention having a thermosetting or hybrid bondable layer, which has been bonded, may also have an overlap shear strength as tested in accordance with ASTM D-1002-94, at room temperature (approximately 23° C.±3° C.) of at least about 6.9 MPa, and preferably at a temperature from room temperature up to and including about 80° C. of at least about 6.9 MPa.

An adhesive article of the present invention having a thermoplastic bondable layer, after bonding, may have an overlap shear of at least 1 MPa, more preferably more than 2 MPa, in accordance with ASTM D-1002-94, at room temperature (approximately 23° C.±3° C.).

In one embodiment, the present invention relates to an adhesive article comprising a bondable layer having on at least one major surface a discontinuous layer of pressure sensitive adhesive, wherein the bondable layer comprises a thermosetting material, the pressure sensitive adhesive layer substantially retains pressure sensitive adhesive characteristics after storage at room temperature for at least about three months prior to bonding the adhesive article, and the adhesive article has a overlap shear measured at room temperature according to ASTM D-1002-94 of at least about 6.9 MPa after bonding.

In another embodiment, the present invention relates to an adhesive article comprising a bondable layer having on at least one major surface a discontinuous layer of pressure sensitive adhesive, wherein the bondable layer comprises a thermoplastic material.

In yet another embodiment, the present invention relates to an adhesive article comprising a bondable layer having on at least one major surface a discontinuous layer of pressure sensitive adhesive, wherein the bondable layer comprises a thermosetting material selected from the group consisting of urethanes, cyanate esters, phenolics, and bismaleimides, and any combinations thereof.

In yet another embodiment, the present invention relates to an adhesive article comprising a bondable layer having on at least one major surface a discontinuous layer of pressure sensitive adhesive, wherein the bondable layer comprises a fusible epoxy prepolymer which is a solid at room temperature.

The present invention also relates to an adhesive article comprising a bondable layer having on at least one major surface a discontinuous layer of pressure sensitive adhesive, wherein the bondable layer comprises a hybrid material and the pressure sensitive adhesive substantially retains pressure sensitive adhesive characteristics after storage at room temperature for at least about three months prior to bonding the adhesive article.

In another embodiment, the present invention relates to an adhesive article comprising a bondable layer having on at least one major surface a continuous layer of pressure sensitive adhesive, wherein the bondable layer comprises a thermosetting material, the pressure sensitive adhesive layer substantially retains pressure sensitive adhesive characteristics after storage at room temperature for at least about three months prior to bonding the adhesive article.

The present invention also relates to an assembly comprising a substrate and an adhesive article as described herein, wherein the substrate is in contact with the pressure sensitive adhesive layer of the adhesive article.

The present invention also relates to a method of making an adhesive article. One method comprises (a) selecting a bondable material, (b) forming a bondable layer, (c) selecting a pressure sensitive adhesive that substantially retains pressure sensitive adhesive characteristics when in contact with the bondable layer after storage at room temperature for at least about three months prior to bonding the adhesive article, and (d) providing a discontinuous layer of the pressure sensitive adhesive on a major surface of the bondable layer, wherein the adhesive article has a overlap shear measured at room temperature according to ASTM D-1002-94 of at least about 6.9 MPa after bonding.

Another method comprises (a) selecting a bondable material, (b) forming a bondable layer, (c) selecting a pressure sensitive adhesive that substantially retains pressure sensitive adhesive characteristics when in contact with the bondable layer after storage at room temperature for at least about three months prior to bonding the adhesive article, and (d) providing a continuous layer of the pressure sensitive adhesive on a major surface of the bondable layer.

DETAILED DESCRIPTION OF THE INVENTION

The present invention relates to an adhesive article comprising a bondable layer and a pressure sensitive adhesive (also referred to throughout as "psa") layer on at least one major surface of the bondable layer as well as an assembly comprising at least one substrate and the adhesive article.

Before being bonded, a bondable layer may provide insufficient, if any, adhesion. Therefore, a pressure sensitive adhesive in accordance with the present invention provides adherence between at least one substrate and the bondable layer so that the adhesive article is held in place on the at least one substrate prior to bonding. Then, a second substrate may be applied to the other side of the bondable layer. In an adhesive article where the pressure sensitive adhesive layer is discontinuous, another discontinuous layer of pressure sensitive adhesive may be provided on the other side of the bondable layer. In another embodiment, where the pressure sensitive adhesive layer is continuous, a second continuous or discontinuous layer of pressure sensitive adhesive may be present on the other side of the bondable layer.

With reference to the layers of an adhesive article of the present invention, the term "on" or "thereon" generally refers to the placement of one layer in contact with, attached to, or adhered to another layer. For the purpose of the present invention, it is possible, however, that there is a layer or material interposed between the two layers being described to enhance the features of the adhesive article or adherence between the layers, as understood by one skilled in the art. For example, a primer layer or a scrim layer may be present between a bondable layer and a pressure sensitive adhesive layer or within the bondable layer.

Preferably, the pressure sensitive adhesive layer retains pressure sensitive adhesive characteristics, for example, tack, before bonding, more preferably retains these characteristics during the useful life of the bondable layer, so that the adhesive article will serve its dual purpose, i.e., forming a pressure sensitive adhesive bond, for example, by maintaining the position of the adhesive article, before bonding, by a pressure sensitive adhesive layer, and forming a sufficiently strong bond for its intended purpose, after bonding, by use of a bondable layer which becomes a bonded layer. If the pressure sensitive adhesive does not retain pressure sensitive adhesive characteristics sufficient to adhere the adhesive article to a substrate, the adhesive article may be basically reduced to the properties of the bondable layer alone, and the benefits of the combination with a pressure sensitive adhesive may not be realized.

The bondable layer and the pressure sensitive adhesive layer are preferably selected so that the pressure sensitive adhesive layer retains pressure sensitive adhesive characteristics for as long as the bondable layer remains useable. The term "retention" with respect to retention of pressure sensitive adhesive characteristics as used herein refers to a pressure sensitive adhesive layer that retains pressure sensitive adhesive characteristics after storage while in contact with a bondable layer. The pressure sensitive adhesive characteristics are not necessarily the same after storage as before storage (i.e., when the adhesive article is first made) but the pressure sensitive adhesive characteristics are sufficiently retained such that they satisfy the requirements of a pressure sensitive adhesive described herein with reference to retaining pressure sensitive adhesive characteristics. Preferably, the pressure sensitive adhesive characteristics are substantially the same before and after storage. The concept of retaining pressure sensitive adhesive characteristics after storage as used herein refers to a pressure sensitive adhesive that, after storage, remains aggressively and permanently tacky at room temperature and firmly adheres to a variety of dissimilar surfaces upon mere contact without the need of more than finger or hand pressure and that requires no activation by water, solvent, or heat and has a sufficiently cohesive and elastic nature so that, despite its aggressive tackiness, it can be handled with the fingers and removed from smooth surfaces without leaving a substantial residue.

In addition, the pressure sensitive adhesive characteristics of the pressure sensitive adhesive layer may be retained after bonding the bondable layer. This is particularly preferable where the pressure sensitive adhesive layer is continuous.

Preferably, the bondable layer and the pressure sensitive adhesive layer are selected so that the characteristics of the bondable or the bonded layer, for example, the adhesion and/or the integrity of the bondable or bonded layer, are not affected by the presence of the pressure sensitive adhesive layer.

Generally, the pressure sensitive adhesive layer of an adhesive article of the present invention retains pressure sensitive adhesive characteristics for the duration of the usable life of the bondable layer. Regardless of the usable life of the bondable layer, the pressure sensitive adhesive layer of the present invention typically retains pressure sensitive adhesive characteristics after storage at room temperature (approximately 23±3° C.) for at least 3 months, preferably at least six months, and more preferably at least 12 months. Preferably, the pressure sensitive adhesive layer retains pressure sensitive adhesive characteristics after storage at 38 to 42° C. for at least about 20 days.

In one embodiment, pressure sensitive adhesive characteristics are retained by using a pressure sensitive adhesive layer that is substantially incompatible with the bondable layer. The phrase "substantially incompatible" as used herein refers to a bondable layer and a pressure sensitive adhesive layer whose components do not intermingle.

In another embodiment, the pressure sensitive adhesive layer has either a substantial resistance to, or lack of any substantial interaction with, any migratory components of the bondable layer such that its pressure sensitive adhesive characteristics are retained. In other words, any migratory components of the bondable layer do not substantially affect the pressure sensitive characteristics of the pressure sensitive adhesive layer.

One way of achieving "substantial incompatibility" between a pressure sensitive adhesive layer and a bondable layer is to employ a pressure sensitive adhesive layer having a solubility parameter that differs substantially from the solubility parameter of any migratory components of the bondable layer. The term "differs substantially" as used herein with reference to solubility parameters generally refers to a solubility parameter difference of at least about 1 $(cal/cm^3)^{0.5}$, typically, at least 1.1 $(cal/cm^3)^{0.5}$, preferably at least 1.2 $(cal/cm^3)^{0.5}$, and more preferably at least 1.3 $(cal/cm^3)^{0.5}$.

Solubility parameters are described in E. A. Grulke in Polymer Handbook: $3^{rd}$ Edition, J. Brandrup, E. H. Immergut, and E. A. Grulke, Editors., John Wiley and Sons, 1999, Section VII, which is incorporated herein by reference. Solubility parameters can be determined experimentally. Alternatively, the solubility parameter may be calculated as described in Fedors, Polym. Eng. and Sci., 14 (1974), 147 and WO 98/21287 (PCT US 96/18841), both of which are incorporated herein by reference.

Alternatively, the pressure sensitive adhesive layer and the migratory component(s) of the bondable layer may not have a solubility parameter difference as described above, but the pressure sensitive adhesive may be selected or formulated so that it can tolerate the presence of some amount of migratory components from the bondable layer without losing its ability to function as a pressure sensitive adhesive layer. In this embodiment, the pressure sensitive adhesive has a glass transition temperature, Tg, with or without migratory component(s) in the range of about −30° C. to about 10° C. (as described on pp. 173–174 of Donatas Satas, "Handbook of Pressure Sensitive Adhesive Technology", $2^{nd}$ Edition, Van Nostrand Rheinhold, New York (1989), incorporated herein by reference). A suitable way to determine the Tg is to measure the maximum in the tan delta peak of a dynamic mechanical scan made by changing the sample temperature while holding the measurement frequency fixed at approximately 0.17 radians/sec (1 Hz).

For example, using the Fox equation, $1/Tg=(w_1/Tg_1+w_2/Tg_2)$, where $w_1$ and $w_2$ refer to the weight fraction of the two components and $T_1$ and $Tg_2$ refer to the glass transition temperature of the two components, as described for example in L. H. Sperling, "Introduction to Physical Polymer Science", $2^{nd}$ Edition, John Wiley & Sons, New York, p. 357 (1992) and T. G. Fox, Bull. Am. Phys. Soc., 1, 123 (1956) which are incorporated herein by reference), the Tg of the migratory component(s), and an estimate of a weight fraction of migratory component(s) in the pressure sensitive adhesive, one may calculate the Tg of a pressure sensitive adhesive which can tolerate the presence of the migratory component(s) in the amount estimated and still retain the desired pressure sensitive adhesive characteristics. As understood by one skilled in the art, the Fox equation can be expanded and used for a system with more than two components. Using the calculated Tg, a suitable pressure sensitive adhesive is then selected or can be formulated to have the calculated Tg, as well understood by one skilled in the art. In another embodiment, the estimated amount of migratory component(s) can be pre-loaded into the selected pressure sensitive adhesive to preempt migration. This removes the concentration gradient which acts as a driving force for migration.

An example of a pressure sensitive adhesive that would not be considered tolerant of migratory components from the bondable layer is one in which curable components and curatives migrating into the pressure sensitive adhesive layer undergo a curing reaction prior to bonding that causes the pressure sensitive adhesive layer to no longer effectively function as a pressure sensitive adhesive as defined above even though the degree of cure (i.e., chemical curing) of the bondable layer is low enough that the bondable layer may still be usable.

The thickness of each of the layers of an adhesive article of the present invention are selected depending on the intended use of the adhesive article, preferably to maximize the overlap shear strength of an adhesive article with a bonded layer. For example, a ratio of the thickness of the bondable layer to the thickness of the pressure sensitive layer may be chosen to achieve an adhesive article having the desired result. For example, the thickness of the bondable layer can be selected to maximize the performance of the bondable layer alone; then the thickness of the pressure sensitive adhesive layer may be chosen to maximize the performance of the bonded adhesive article. Particular performance characteristics include overlap shear strength and peel strength. Typically, the ratio of bondable layer thickness to pressure sensitive adhesive layer thickness is at least 4:1.

As the thickness of a discontinuous pressure sensitive adhesive layer increases, the ability of the bondable layer to wet out the substrate during bonding, for example, heating, may decrease. In addition, as the thickness of a pressure sensitive adhesive layer increases, the overlap shear strength of the adhesive article having a bonded layer may decrease in the regions where pressure sensitive adhesive is present, regardless of whether the pressure sensitive adhesive layer is discontinuous or continuous. Furthermore, in embodiments where substrate surfaces of a uniform height are desired, it is preferable to minimize the thickness of a discontinuous layer of pressure sensitive adhesive in order to avoid the possibility of undesirable telegraphing of the discontinuous pattern to the exposed surface of a substrate such that the substrate surface becomes irregular.

A pressure sensitive adhesive layer generally has a thickness of from about 2 to 1000 micrometers, typically 5 to 250 micrometers, preferably 5 to 100 micrometers, more preferably 10 to 50 micrometers. A bondable layer generally has a thickness of from about 5 to 3000 micrometers, typically 10 to 2000 micrometers, preferably 20 to 1000 micrometers, more preferably from 200 to 1000 micrometers. When the pressure sensitive adhesive layer is continuous, the bondable layer preferably has a thickness of from about 75 micrometers to about 200 micrometers and the pressure sensitive adhesive layer typically has a thickness of about 12.5 micrometers to about 62.5 micrometers, preferably 12.5 micrometers to 50 micrometers, more preferably 12.5 micrometers to 37.5 micrometers, and most preferably 25 micrometers to 37.5 micrometers.

Bondable Layer

A bondable layer of the present invention may comprise a thermosetting material, a thermoplastic material, or a hybrid material. The term "material" as used herein refers to monomers, oligomers, prepolymers, and/or polymers. In addition, the bondable layer may include optional additives, and in the case of a bondable material comprising a thermosetting material, may also include a curative or curatives.

The term "bondable" as used herein means that a bond between two substrates can be achieved by the application of heat; actinic radiation such as UV, visible, or infrared; microwave or X-ray energy; or combinations thereof; the term "bondable" may also refer to a curable material. The bondable layer of the present invention is preferably a heat bondable layer which, upon application of heat, undergoes an initial decrease in viscosity which promotes wetting of the substrate and enhances adhesion and, in the case of, for example, a thermosetting material, causes a curing reaction.

After application of application of heat; actinic radiation such as UV, visible, or infrared; microwave or X-ray energy; or combinations thereof sufficient to accomplish a bond between substrates, a bondable layer is referred to herein as bonded or cured. Actinic radiation may be used to activate or complete bonding. The type of bonding application is chosen depending on whether one or two substrates are present, the type of substrate, and the choice of bondable layer; for example, when two metal substrates are used, it is preferably to bond using heat.

The terms "bondable" and "bonded" as used herein are not intended to encompass the act of attaching or applying the adhesive article to a substrate before the application of heat, actinic radiation such as UV, visible, or infrared, or microwave or X-ray energy. In other words, applying, attaching, or contacting the pressure sensitive adhesive layer or the bondable layer to or with a substrate is not considered bonding for the purpose of the present invention. Bonding refers to forming a permanent bond. For example, in the case of a thermoplastic material, bonding means that heat has been applied.

The term "thermosetting" as used herein refers to a material, which undergoes a curing reaction that results in a chemical change upon bonding and an increase in the hardness of the material. The term "thermoset" as used herein refers to a thermosetting material, which has been cured. A thermosetting material may generally be bonded by application of heat, actinic radiation such as UV, visible, or infrared, or microwave or X-ray energy.

The term "thermoplastic" as used herein refers to a material which undergoes a physical change upon the application of heat, i.e., the material flows upon bonding and returns to its initial non-flowing state upon cooling. A thermoplastic material is typically bonded by application of heat.

The term "hybrid material" refers to a material which is a combination of at least two components, wherein the at least two components are compatible in the melt phase (the melt phase is where the combination of the at least two components is a liquid), the at least two components form a interpenetrating polymer network or semi-interpenetrating polymer network, and at least one component becomes infusible (i.e., the component cannot be dissolved or melted) after application of heat or by other means of curing such as application of light. A hybrid material will be described in more detail below. A hybrid material may generally be bonded by application of heat, actinic radiation such as UV, visible, or infrared, or microwave or X-ray energy.

A hybrid material is, for the purpose of the present invention, mutually exclusive of the classes of thermosetting and thermoplastic materials defined herein. In other words, thermosetting materials and any optional additives or thermoplastic materials and any optional additives will be considered non-hybrid materials if they do not meet the definition of hybrid material as defined herein.

Exemplary material for the bondable layer are described below. The bondable material is preferably selected for an adhesive article of the present invention so that, upon contact with a pressure sensitive adhesive layer, pressure sensitive adhesive characteristics of the pressure sensitive adhesive layer are retained as described above. The bondable layer is preferably storage stable at room temperature.

Thermosetting Material

Suitable thermosetting materials are those that can be used to prepare a bondable layer in film form having latency. By latency, it is meant that the bonding process can be substantially prevented until the adhesive article can be prepared and placed between substrates to be bonded. In some cases, achieving this latency may require dark and/or cold storage.

A bondable layer comprising a thermosetting material preferably, after bonding, has overlap shear strength according to ASTM D-1002-94, at room temperature (approximately 23° C.±3° C.), approaches or exceeds the internal strength (typically the tensile strength) of a substrate, wherein the substrate is at least as strong as the form it would take in the intended application. More preferably, when the pressure sensitive adhesive layer is discontinuous, the bondable layer comprises a thermosetting material, which after bonding, has an overlap shear strength of at least about 6.9 MegaPascals (MPa) (1,000 pounds per square inch (psi)), in accordance with ASTM D-1002-94, at room temperature (approximately 23° C.±3° C.). Most preferably, when the pressure sensitive adhesive layer is discontinuous, the resulting adhesive article with a thermosetting bondable layer, upon bonding, has an overlap shear strength of at least about 6.9 MPa, in accordance with ASTM D-1002-94, at room temperature (approximately 23° C.±3° C.). An adhesive having an overlap shear strength of at least about 6.9 MPa, in accordance with ASTM D-1002-94, at room temperature (approximately 23° C.±3° C.) is considered to be a structural adhesive, as described in A. V. Pocius, "Adhesion and Adhesives Technology," Hanser/Gardner 1997, p.183, incorporated herein by reference.

When the pressure sensitive adhesive layer is continuous and the bondable layer comprises a thermosetting material, the bondable layer after being bonded preferably has an overlap shear of at least 1 MPa, more preferably more than 2 MPa, in accordance with ASTM D-1002-94, at room temperature (approximately 23° C.±3° C.).

Suitable thermosetting materials include epoxides, urethanes, cyanate esters, bismaleimides, phenolics, including nitrile phenolics, and any combinations thereof.

Epoxides

Suitable epoxides include those containing at least two 1,2-cyclic ethers. Such compounds can be saturated or unsaturated, aliphatic, aromatic or heterocyclic, or can comprise combinations thereof. Suitable epoxides may be solid or liquid at room temperature.

Compounds containing at least two epoxide groups (i.e., polyepoxides) are preferred. A combination of epoxide compounds may be employed, and an epoxide having a functionality of less than two may be used in a combination so long as the overall epoxide functionality of the mixture is at least two. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). It is also within the scope of this invention to use a material with functionality in addition to epoxide functionality but which is essentially unreactive with the epoxide functionality, for example, a material containing both epoxide and acrylic functionality.

A wide variety of commercial epoxies are available and listed in "Handbook of Epoxy Resins" by Lee and Neville, McGraw Hill Book Company, New York (1967) and in "Epoxy Resin Technology" by P. F. Bruins, John Wiley & Sons, New York (1968), and in "Epoxy Resins: Chemistry and Technology, $2^{nd}$ Edition" by C. A. May, Ed., Marcel Dekker, Inc. New York (1988). Aromatic polyepoxides (i.e., compounds containing at least one aromatic ring structure, e.g., a benzene ring, and at least two epoxide groups) that can be used in the present invention include the polyglycidyl ethers of polyhydric phenols, such as Bisphenol A- or Bisphenol-F type resins and their derivatives, aromatic polyglycidyl amines (e.g., polyglycidyl amines of benzenamines, benzene diamines, naphthylenamines, or naphthylene diamines), polyglycidyl ethers of phenol formaldehyde resole or novolak resins; resorcinol diglycidyl ether; polyglycidyl derivatives of fluorene-type resins; and glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof. Preferred aromatic polyepoxides are the polyglycidyl ethers of polyhydric phenols, such as the series of diglycidyl ethers of Bisphenol-A commercially available from Shell Chemical Inc., Houston, Tex., for example, under the trade designations "EPON 828" and "EPON 1001 F" and the series of diglycidyl ethers of Bisphenol-A and Bisphenol F and their blends commercially available from Shell Chemical Inc., for example, under the trade designations "Epikote 232" and "Epikote 1001" available from Shell Chemical Inc., Pemis, The Netherlands. Other useful commercially available aromatic epoxides include the "DER" series of Bisphenol epoxides, and "DEN" series of epoxy novolak resins available from Dow Chemical, Midland, Mich., diglycidyl ether of fluorene Bisphenol, available from Shell Chemical Inc., Houston, Tex., under the trade designation "EPON HPT Resin 1079", a triglycidyl derivative of p-aminophenol commercially available from Ciba Performance Polymers, Brewster, N.Y. under the trade designation "MY 0500", a tetraglycidyl derivative of methylene dianiline commercially available from Ciba Performance Polymers, Brewster, N.Y. under the trade designation "MY 720". Flame retardant epoxies may also be used, for example, the flame retardant brominated Bisphenol-A diglycidyl ether commercially available from Dow Chemical, Midland, Mich., under the trade designation "DER 580". The term "derivative" as used herein with reference to thermosetting materials refers to a base molecule with additional substituents that do not interfere with the thermosetting bonding of the base molecule.

Representative aliphatic cyclic polyepoxides (i.e., cyclic compounds containing one or more saturated carbocyclic rings and at least two epoxide groups, also known as alicyclic compounds) useful in the present invention include the series of alicyclic epoxides commercially available from Union Carbide Corp., Danbury, Conn., under the trade designation "ERL", such as vinyl cyclohexene dioxide ("ERL-4206"), 3,4-epoxycyclohexylmethyl-3,4-epoxycyclohexane carboxylate ("ERL-4221"), 3,4-epoxy-6-methylcyclohexylmethyl-3,4-epoxy-6-methylcyclohexane carboxylate ("ERL-4201"), bis(3,4-epoxy-6-methylcycylohexylmethyl)adipate ("ERL-4289"), and dipentenedioxide ("ERL-4269").

Representative aliphatic polyepoxides (i.e., compounds containing no carbocyclic rings and at least two epoxide groups) include 1,4-bis(2,3-epoxypropoxy)butane, polyglycidyl ethers of aliphatic polyols such as glycerol, polypropylene glycol, 1,4-butanediol, and the like, the diglycidyl ester of linoleic acid dimer, epoxidized polybutadiene (for example, those available under the trade designation "OXIRON 2001" from FMC Corp., Philadelphia, Pa. or "Poly bd" from Elf Atochem, Philadelphia, Pa.), epoxidized aliphatic polyurethanes, and epoxy silicones, e.g., dimethylsiloxanes having cycloaliphatic epoxide or glycidyl ether groups.

Examples of suitable epoxide-based bondable layers that are commercially available in film form include those available from Minnesota Mining and Manufacturing Company ("3M"), St. Paul, Minn. under the trade designation "3M Scotch-Weld Structural Adhesive Film" including those having the following "AF" designations: "AF 42", "AF 111", "AF 126-2", "AF 163-2", "AF 3109-2", "AF 191", "AF 2635", "AF 3002", "AF 3024", and "AF 3030FST".

A preferred thermosetting bondable layer comprises a fusible epoxide prepolymer (which can melt and flow unlike a B stage resin) which is a solid at room temperature and, more preferably, further comprises a second epoxide component which may be solid or liquid at room temperature. Suitable solid fusible epoxide prepolymers include those described above which are a solid at room temperature.

An exemplary bondable layer may comprise a solid fusible epoxide prepolymer comprising a diglycidyl ether of Bisphenol A alone or in combination with a diglycidyl ether of Bisphenol A or Bisphenol F or a blend thereof. The bondable layer is a solid at room temperature after the addition of any optional components, more preferably the epoxide material (comprising single or multiple epoxides) is a solid at room temperature. A preferable optional additive, as described below, is a core-shell toughener, which is present in an amount ranging from 10 to 30 parts by weight (pbw), based on 100 parts by weight of epoxide component(s).

Urethane Materials

The term "urethane materials" as used herein applies to polymers made from the reaction product of a compound containing at least two isocyanate groups (–N=C=O), referred to herein as "isocyanates", and a compound containing at least two active-hydrogen containing group. Examples of active-hydrogen containing groups include primary alcohols, secondary alcohols, phenols and water; and primary and secondary amines (which react with the isocyanate to form a urea linkage). A wide variety of isocyanate-terminated materials and appropriate co-reactants are well known, and many are commercially available (see for example, Gunter Oertel, "Polyurethane Handbook", Hanser Publishers, Munich (1985)).

In order to prepare storage-stable bondable layers based on urethane materials it is preferable to use either an isocyanate or an active hydrogen-containing compound that is blocked. The term "blocked" as used herein refers to a compound that has been reacted with a second compound (i.e. "blocking group") such that its reactive functionality is not available until such time as the blocking group is removed, for example by heating, or by further reaction, such as with water. Examples of blocked isocyanates include those that have been co-reacted with phenol, methyl ethyl ketoxime, and epsilon-caprolactam. Examples of blocked active-hydrogen containing compounds include aldehyde or ketone blocked amines (known as ketimines); aldehyde blocked aminoalcohol (known as oxazolidines); and amines that have been complexed with a salt such as sodium chloride.

When blocked isocyanates are used, examples of suitable co-reactants include polyether polyols such as poly(oxypropylene) glycols, ethylene oxide capped poly(oxypropylene) glycols, and poly(oxytetramethylene) glycols; diamino poly(oxypropylene) glycols; aromatic amine terminated poly(propylene ether) glycols; styrene-acrylonitrile graft polyols; poly(oxyethylene) polyols; polyester polyols such as polyglycol adipates, polyethylene terephthalate polyols, and polycaprolactone polyols; polybutadiene polyols, hydrogenated polybutadiene polyols, polythioether polyols, silicone carbinol polyols, polybutylene oxide polyols, acrylic polyols, carboxy-functional polypropylene oxide polyols, carboxy functional polyester polyols; and aromatic amine-terminated poly(tetrahydrofuran). Suitable urethane resins include blocked urethanes such as that available under the trade designation "Adeka Resin QR-9276" from Asahi Denka Kogyo K. K. Tokyo, Japan, and urethane modified epoxides such as that available under the trade designation "Rutapox VE 2306" from Rutgers Bakelite GmbH, Duisburg, Germany.

Cyanate Ester Materials

Suitable cyanate ester materials (monomers and oligomers) are those having two or more —O—C≡N functional groups, including those described in U.S. Pat. No. 5,143,785, incorporated herein by reference.

Examples of suitable cyanate ester compounds include the following: 1,3-and 1,4-dicyanatobenzene; 2-tert-butyl-1,4-dicyanatobenzene; 2,4-dimethyl-1,3-dicyanatobenzene; 2,5-di-tert-butyl-1,4-dicyanatobenzene; tetramethyl-1,4-dicyanatobenzene, 4-chloro- 1,3-dicyanatobenzene; 1,3,5-tricyanatobenzene; 2,2, -or 4,4, -dicyanatobiphenyl; 3,3', 5,5',-tetramethyl-4,4',-dicyanatobiphenyl; 1,3-, 1,4-, 1,5-, 1,6-, 1,8-, 2,6-, or 2,7-dicyanatonaphthalene; 1,3,6-tricyanatonaphthalene; bis(4-cyanatophenyl)methane; bis(3-chloro-4-cyanatophenyl)methane; bis(3,5-dimethyl-4-cyanatophenyl)methane; 1,1-bis(4-cyanatophenyl)ethane; 2,2-bis(4-cyanatophenyl)propane; 2,2-bis(3,5-dibromo-4-cyanatophenyl)propane; 2,2-bis(4-cyanatophenyl)-1,1,1,3,3,3-hexafluoropropane; bis(4-cyanatophenyl)ether; bis(4-cyanatophenoxyphenoxy)benzene; bis(4-cyanatophenyl) ketone; bis(4-cyanatophenyl)thioether; bis(4-cyanatophenyl)sulfone; tris(4-cyanatophenyl)phosphite; and tris(4-cyanatophenyl)phosphate. Polycyanate compounds obtained by reacting a phenol-formaldehyde precondensate with a halogenated cyanide are also suitable.

Other suitable materials include cyanic acid esters derived from phenolic resins as described in U.S Pat. No. 3,962,184, cyanated novolac resins derived from novolac resins as described in U.S. Pat. No. 4,022,755, cyanated bisphenol-type polycarbonate oligomers derived from bisphenol-type polycarbonate oligomers as described in U.S. Pat. No. 4,026,913, cyanato-terminated polyarylene ethers as described in U.S. Pat. No. 3,595,900, dicyanate esters free of ortho hydrogen atoms as described in U.S. Pat. No. 4,740,584, mixtures of di-and tricyanates as described in U.S. Pat. No. 4,709,008, polyaromatic cyanates containing polycyclic aliphatics as described in U.S. Pat. No. 4,528,366, fluorocarbon cyanates as described in U.S. Pat. No. 3,733,349, and other cyanate compositions as described in U.S. Pat. Nos. 4,195,132 and 4,116,946, all of which are incorporated herein by reference.

An exemplary commercially available material is a cyanate ester available from Ciba Performance Polymers, Brewster, N.Y. under the trade designation "Quatrex 7187".

Phenolic Materials

Suitable phenolic resins are generally described in *Encyclopedia of Polymer Science and Engineering*, Volume 11, John Wiley & Sons, Inc. (New York, 1988), pp. 45–92. Phenolic-based resins are generally described in Alphonsus V. Pocius, *Adhesion and Adhesives Technology: An Introduction*, Hanser Publishers (New York, 1997), pp.185–188. Preferred phenolic resins that can be used to impregnate a sheet which is suitable to prepare hot press laminated products from wood veneers are discussed in U.S. Pat. No. 1,960,176, incorporated herein by reference.

Suitable phenolic materials are those made as the reaction product of phenols and formaldehydes, including resole phenolics and novolac phenolics. Examples of phenols include phenol, resorcinol, para-substituted phenol, cresol, and the reaction product of bisphenol A and the monoglycidyl ether of bisphenol A. Exemplary phenolic-based bondable layers include tissue paper impregnated with a thermosetting phenolic resin at a ratio of approximately two parts resin to one part tissue paper commercially available under the trade designation "Phenolic Glue Film" from Dyno Overlays Inc., High Point, N.C.

Resole phenolic resins are characterized by being alkaline catalyzed and having a molar ratio of formaldehyde to phenol of greater than or equal to 1:1. Typically, the ratio of formaldehyde to phenol is within a range of about 1:1 to about 3:1. Examples of suitable alkaline catalysts for preparing resole phenolic resins include sodium hydroxide, potassium hydroxide, organic amines, or sodium carbonate.

Novolac phenolic resins are characterized by being acid catalyzed and having a molar ratio of formaldehyde to phenol of less than 1:1. Typically, the ratio of formaldehyde to phenol is within a range of about 0.4:1 to about 0.9:1. Examples of the acid catalysts used to prepare novolac phenolic resins include sulfuric, hydrochloric, phosphoric, oxalic, or p-toluenesulfonic acids. Although novolac phenolic resins are typically considered to be thermnoplastic resins rather than thermosetting resins, they can react with other chemicals (e.g., hexamethylenetetraamine) to form a thermoset resin.

Examples of useful commercially available resole or novolac phenolic resins include "Varcum" from BTL Specialty Resins Corporation, Blue Island, Ill.; "Arofene" from Ashland Chemical Company, Columbus, Ohio; "Bakelite" from Union Carbide, Danbury, Conn.; and "Resinox" from Monsanto Chemical Company, St. Louis, Mo.

Suitable nitrile phenolic materials include those made by including butadiene-nitrile elastomers in novolac phenolic resin-based materials. Examples of suitable nitrile phenolic based bondable layers that are commercially available in film form include those available from Minnesota Mining and Manufacturing Company ("3M"), St. Paul, Minn. under the trade designation "3M Scotch-Weld Structural Adhesive Film" and having the following "AF" designations: "AF 10", "AF 30", "AF 31" and "AF 32".

Bismaleimide Materials

Examples of suitable bismaleimide materials, also known as N,N'-bismaleimide monomers and prepolymers, include the N,N'-bismaleimides of 1,2-ethanediamine, 1,6-hexanediamine, trimethyl-1,6-hexanediamine, 1,4-benzenediamine, 4,4'-methylene-bis(benzenamine), 2-methyl-1,4-benzenediamine, 3,3'-methylene-bis (benzenamine), 3,3'-sulfonyl-bis(benzenamine), 4,4'-sulfonyl-bis(benzenamine), 3,3'-oxy-bis(benzenamine), 4,4'-oxy-bis(benzenamine), 4,4'-methylene-bis (cyclohexanamine), 1,3-benzenedimethanamine, 1,4-benzenedimethanamine, and 4,4'-cyclohexane-bis (benzenamine) and mixtures thereof; Other N,N'-bismaleimides and their process of preparation are described in U.S. Pat. Nos. 3,562,223; 3,627,780; 3,839,358; and 4,468,497, all of which are incorporated herein by reference.

Representative examples of commercially available bis-maleimide materials include the series of materials available from Shell Chemical, Houston, Tex. under the trade designation "COMPIMIDE" such as 4,4'-bismaleimidodiphenyl methane ("COMPIMIDE Resin MDAB"), and 2,4'-bismaleimidotoluene ("COMPIMIDE Resin TDAB"), and from Dexter/Quantum, San Diego, Calif. under the trade designation "Q-Bond".

Curatives for Thermosetting Materials

A thermosetting bondable layer preferably comprises a thermosetting material and a curative or curatives. The term "curative" is used broadly to include not only those materials that are conventionally regarded as curatives but also those materials that catalyze or accelerate the reaction of the curable material as well as those materials that may act as both curative and catalyst or accelerator. It is also possible to use two or more curatives in combination.

Preferred heat activated curatives for use in the present invention exhibit latent thermal reactivity; that is, they react primarily at higher temperatures (preferably at a temperature of at least 80° C.), or react at lower temperatures only after an activation step such as exposure to actinic radiation. This allows the adhesive composition to be readily mixed and coated at room temperature (about 23±3° C.) or with gentle warming without activating the curative (i.e., at a temperature that is less than the reaction temperature for the curative). One skilled in the art would readily understand which curatives are appropriate for each class of thermosetting materials.

Suitable curatives for epoxide polymerization include polybasic acids and their anhydrides; nitrogen-containing curatives; chloro-, bromo-, and fluoro-containing Lewis acids of aluminum, boron, antimony, and titanium; photochemically activated generators of protic or Lewis acids; and phenolic materials as described above.

Exemplary polybasic acids and their anhydrides include di-, tri-, and higher carboxylic acids such as oxalic acid, phthalic acid, terephthalic acid, succinic acid, alkyl substituted succinic acids, tartaric acid, phthalic anhydride, succinic anhydride, malic anhydride, nadic anhydride, pyromellitic anhydride; and polymerized acids, for example, those containing at least 10 carbon atoms, such as dodecendioic acid, 10,12-eicosadiendioic acid, and the like.

Nitrogen-containing curatives include, for example, dicyandiamide, imidazoles (e.g. hexakis(imidazole) nickel phthalate), imidazolates, dihydrazides (e.g. adipic dihydrazide and isophthalic dihydrazide), ureas, and melamines, as well as encapsulated aliphatic amines (e.g., diethylenetriamine, triethylenetetraamine, cyclohexylamine, triethanolamine, piperidine, tetramethylpiperamine, N,N-dibutyl-1,3-propane diamine, N,N-diethyl-1,3-propane diamine, 1,2-diamino-2-methyl-propane, 2,3-diamino-2-methyl-butane, 2,3-diamino-2-methyl-pentane, 2,4-diamino-2,6-dimethyl-octane, dibutylamine, and dioctylamine). The term "encapsulated" as used herein means that the amine is surrounded by a material that prevents it from acting as a curative until the application of heat. Polymer bound amines or imidazoles may also be used. Pyridine, benzylamine, benzyldimethylamine, and diethylaniline are also useful as heat activated curatives.

Examples of nitrogen-containing curatives include those commercially available from Air Products, Allentown, Pa., under the trade designations, "Amicure CG-1200", "AMICURE CG-1400", "Ancamine 2337", "Ancamine 2441", "Ancamine 2014"; and those from Asahi Denka Kogyo K. K. Tokyo, Japan, under the trade designations "Ancamine 4338S" and "Ancamine 4339S"; those from CVC Specialty Chemicals, Mapleshade, N.J., under the trade designations "Omicure U-52" and "Omicure U-410" as well as the other materials in the "Omicure" series; those from Landec, Menlo Park, Calif., under the trade designations "Intellimer 7001", "Intellimer 7002", "Intellimer 7004", and "Intellimer 7024"; those from Shikoku Fine Chemicals, Japan, and sold by Air Products, as the series of materials available under the trade designation "Curezol"; and those from Ajinomoto Company Inc., Teaneck, N.J., as the series of materials available under the trade designation "Ajicure".

Exemplary chloro-, bromo-, and fluoro-containing Lewis acids of aluminum, boron, antimony, and titanium include aluminum trichloride, aluminum tribromide, boron trifluoride, antimony pentafluoride, titanium tetrafluoride, and the like. Preferably, these Lewis acids may be blocked to increase the latency of the thermosetting material. Representative blocked Lewis acids include $BF_3$-monoethylamine, and the adducts of $HSbF_5X$, in which X is halogen, —OH, or —$OR^1$ in which $R^1$ is the residue of an aliphatic or aromatic alcohol, aniline, or a derivative thereof, as described in U.S. Pat. No. 4,503,211, incorporated herein by reference.

Suitable photochemically activated curatives for epoxide polymerization include cationic photocatalysts that generate an acid to catalyze polymerization. It should be understood that the term "acid" can include either protic or Lewis acids. These cationic photocatalysts can include a metallocene salt having an onium cation and a halogen containing complex anion of a metal or metalloid. Other useful cationic photocatalysts include a metallocene salt having an organometallic complex cation and a halogen-containing complex anion of a metal or metalloid which are further described in U.S. Pat. No. 4,751,138 (e.g., column 6, line 65 to column 9, line 45). Other examples of useful photocatalysts include organometallic salts and onium salts, for example, those described in U.S. Pat. No. 4,985,340 (e.g., col. 4, line 65 to col. 14, line 50) and in European Patent Applications 306, 161 and 306,162. Still other cationic photocatalysts include an ionic salt of an organometallic complex in which the metal is selected from the elements of Periodic Group IVB, V13, VIB, V1113 and VIIIB which is described in European Patent Application 109,581. A suitable photochemically activated curative is a curative commercially available from Ciba-Geigy, Hawthorne, N.Y. under the trade designation "Irgacure 261".

Suitable curatives for urethane materials include the nitrogen-containing curatives as described for use with epoxides (which can react with a blocked isocyanate isocyanate group after the deblocking reaction to give a urea) as well as, for example, materials containing hydroxyl (e.g., phenols) or thiol functionality that can react with the deblocked isocyanate. Photochemically activated generators of protic or Lewis acids can be used to enhance these reactions.

Suitable curatives for cyanate ester materials include the nitrogen-containing curatives as described for use with epoxides as well as curatives that may be thermally or photochemically activated. Examples of such curatives include organometallic compounds containing a cyclopentadienyl group ($C_5 H_5$) and derivatives of a cyclopentadienyl group. Suitable curatives include cyclopentadienyl iron dicarbonyl dimer ($[C_5H_5Fe(CO)_2]_2$), pentamethylcyclopentadienyl iron dicarbonyl dimer ($[C_5(CH_3)_5Fe(CO)_2]_2$), methylcyclopentadienyl manganese tricarbonyl ($C_5H_4(CH_3)Mn(CO)_3$), cyclopentadienyl manganese tricarbonyl ($C5H_5Mn(CO)_3$), all of which are available from Strem Chemical Company, Newburyport, Mass. Other suitable curatives include the hexafluorophosphate salt of the cyclopentadienyl iron mesitylene cation ($C_5H_5$(mesitylene)$Fe^+$ $PF_6^-$), and the trifluoromethanesulfonate salt of the cyclopentadienyl iron mesitylene cation ($C_5H_5$(mesitylene)$Fe^+$ ($CF_3SO_3^-$)), both of which may be prepared by methods described in U.S. Pat. No. 4,868,288 which is incorporated herein by reference.

Suitable curatives for phenolic materials and for nitrile phenolic materials include hexamethylene tetraamine (a latent source of formaldehyde) as well as combinations of organic acids (e.g. phosphoric acid, para toluene sulfonic acid, and salicylic acid) and metallic oxides (e.g. zinc oxide and magnesium oxide).

Suitable curatives for bismaleimide materials include the nitrogen containing curatives as described for use with epoxides as well as latent sources of allyl phenol.

Thermoplastic Materials

Suitable thermoplastic materials include, for example, polyesters, ethylene vinyl acetate (EVA), polyurethanes, polyamides, polyolefins, and derivatives thereof. The term "derivative" as used herein with reference to thermoplastic materials refers to a base molecule with additional substituents that are not reactive towards a crosslinking or polymerization reaction.

Thermoplastic materials, by nature, typically do not require curatives. A thermoplastic material of the present invention is prepared in film form. Preferably, a bondable layer comprising a thermoplastic material, upon bonding, has an overlap shear strength of at least about 1 MPa, preferably at least about 2 MPa, more preferably at least about 3 MPa, most preferably at least about 4 MPa. The range of from about 4 to about 6.9 MPa is considered herein "semi-structural strength."

Exemplary thermoplastic bondable layers in film form include those commercially available from 3M under the trade designations "3M Thermo-Bond Film 560", "3M Thermo-Bond Film 615", "3M Thermo-Bond Film 770", "3M Thermo-Bond Film 870".

Hybrid Materials

A hybrid material is a combination of at least two components wherein the at least two components are compatible in the melt phase (the melt phase is where the combination of the at least two components is a liquid), the at least two components form a interpenetrating polymer network or semi-interpenetrating polymer network, and at least one component becomes infusible (i.e., the component cannot be dissolved or melted) after application of heat or by other means of curing such as application of light. A first component is a crosslinkable material and a second component is (a) a thermoplastic material, (b) monomers, oligomers, or polymers (and any required curative) which can form a thermoplastic material, (c) a thermosetting material, i.e., monomers, oligomers, or prepolymers (and any required curative) which can form a thermosetting material. The second component is chosen so that it is not reactive with the first component. It may be desirable, however, to add a third component which may be reactive with either or both of the crosslinkable material and second component for the purpose of, for example, increasing the cohesive strength of the bonded hybrid material.

Suitable first components include thermosetting materials, for example, the thermosetting materials described above, as well as crosslinkable elastomers such as acrylics and urethanes as described above.

Suitable thermoplastic second components include those thermoplastic materials described above. Suitable thermoplastics which can be formed in situ, i.e., with monomers, oligomers, or polymers (and any required curative) which can form a thermoplastic material without undergoing any significant crosslinking reaction would be readily apparent to one skilled in the art. Exemplary hybrid materials incorporating a second component (a) are described, for example, in PCT/EP98/06323; U.S. Pat. No. 5,709,948, and U.S. Ser. No. 09/070,971, all of which are incorporated herein by reference. Exemplary hybrid materials incorporating a second component (b) are described, for example, in U.S. Pat. No. 5,086,088, which is incorporated herein by reference. Example 1 of U.S. Pat. No. 5,086,088 illustrates an example of a thermoplastic material formed in situ.

Suitable thermosetting second components include those thermosetting materials described above. Exemplary hybrid materials incorporating a second component (c) are described, for example, in U.S. Pat. No. 5,494,981, which are incorporated herein by reference.

A bondable layer comprising a hybrid material upon bonding preferably has overlap shear strength according to ASTM D-1002-94, at room temperature (approximately 23° C.±3° C.) is at least about 6.9 MPa.

Optional Additives for the Bondable Layer

Optionally, the bondable layer may also include additives, such as film-forming materials, intended to improve handling characteristics before bonding or additives intended to improve the final performance of the bonded layer.

Examples of additives include thixotropic agents such as fumed silica; pigments such as ferric oxide, brick dust, carbon black, and titanium oxide; fillers such as silica, magnesium sulfate, calcium sulfate, and beryllium aluminum silicate; clays such as betonite; glass beads; bubbles made from glass or phenolic resin; expandable microspheres, for example, microspheres commercially available from Expancel Inc./Akzo Nobel, Duluth, Ga., under the trade designation "Expancel DU"; anti-oxidants; UV-stabilizers; corrosion inhibitors, for example, those commercially available from W. R. Grace GmbH, Worms, Germany under the trade designation "Shieldex AC5"; reinforcing material such as unidirectional, woven, and non-woven webs of organic and inorganic fibers such as polyester (commercially available from Technical Fibre Products, Slate Hill, N.Y. and from Reemay Inc., Old Hickory, Tenn.), polyimide, glass, polyamide such as poly (p-phenylene terephthalamide (commercially available from E. I, duPont de Nemours and Co. Inc., Wilmington, Del. under the trade designation "Kevlar"), carbon, and ceramic. Other suitable additives include those that provide thermal or electrical conductivity such as electrically or thermally conductive particles, electrically or thermally conductive woven or non-woven webs, or electrically or thermally conductive fibers. It may also be desirable to provide additives that function as energy absorbers for such curing methods as microwave curing.

An additional exemplary additive is a rubbery heterophase that may be introduced into the thermosetting material. The rubbery heterophase can be introduced as a latex of dispersed natural or synthetic rubber as described in U.S. Pat. No. 3,316,195, incorporated herein by reference, or a graded rubber or core/shell rubber particle (for example, those commercially available from Rohm & Haas, Lauterbourg, France under the trade designation "Paraloid EXL2600", or from Rohm & Haas, Philadelphia, Pa. under the trade designation "Paraloid EXL2691" or from Kaneka Texas Corporation, Houston, Tex., under the trade designation "Kaneace B56") as described in U.S. Pat. Nos. 3,833, 683, 3,856,883, and 3,864,426, all of which are incorporated herein by reference. The rubbery heterophase may also be introduced into the thermosetting material by dissolving reactive elastomer into the thermosetting material such that the elastomer reacts with and phase separates from the thermosetting material during curing as described in U.S. Pat. Nos. 4,107,116 and 3,894,112, which are incorporated herein by reference. It is also possible to use a thermosetting material that already includes a rubbery heterophase, such as that available from Shell Chemical, Houston, Tex., under the trade designation "EPON 58006". A detailed discussion of the use of a rubbery heterophase in thermosetting compositions is described in the Advances in Chemistry Series 208, "Rubber-Modified Thermoset Resins" edited by C. K. Riew and J. K. Gillham, American Chemical Society, Washington, 1984, incorporated herein by reference.

Pressure Sensitive Adhesive Layer

A pressure sensitive adhesive layer in accordance with the present invention comprises a pressure sensitive adhesive material. One well known means of identifying pressure sensitive adhesives is the Dahlquist criterion. This criterion defines a pressure sensitive adhesive as an adhesive having a 1 second creep compliance of greater than $1\times10^{-6}$ cm$^2$/dyne as described in "Handbook of Pressure Sensitive Adhesive Technology", Donatas Satas (Ed.), $2^{nd}$ Edition, p. 172, Van Nostrand Reinhold, New York, N.Y., 1989, incorporated herein by reference. Alternatively, since modulus is, to a first approximation, the inverse of creep compliance, pressure sensitive adhesives may be defined as adhesives having a Young's modulus of less than $1\times10^6$ dynes/cm2.

Another well known means of identifying a pressure sensitive adhesive is that it is aggressively and permanently tacky at room temperature and firmly adheres to a variety of dissimilar surfaces upon mere contact without the need of more than finger or hand pressure as described in "Glossary of Terms Used in the Pressure Sensitive Tape Industry" provided by the Pressure Sensitive Tape Council, August, 1985, incorporated herein by reference. Any of these methods of identifying a pressure sensitive adhesive may be used to identify suitable pressure sensitive adhesives of the present invention.

Another suitable definition of a suitable pressure sensitive adhesive is that it preferably has a room temperature storage modulus within the area defined by the following points as plotted on a graph of modulus versus frequency at 25° C.: a range of moduli from approximately $2\times10^5$ to $4\times10^5$ dynes/cm$^2$ at a frequency of approximately 0.1 radians/sec (0.017 Hz), and a range of moduli from approximately $2\times10^6$ to $8\times10^6$ dynes/cm$^2$ at a frequency of approximately 100 radians/sec (17 Hz) (for example see FIGS. 8–16 on p. 173 of Donatas Satas, "Handbook of Pressure Sensitive Adhesive Technology", $2^{nd}$ Edition, Van Nostrand Rheinhold, New York (1989).

The pressure sensitive adhesive layer of the present invention in one embodiment is a discontinuous layer. The term "discontinuous" as used herein refers to the fact that the bondable layer is not completely covered by the pressure sensitive adhesive layer and, therefore, the bondable layer can make contact with and bond directly to a suitable substrate, although other layers may be interposed such as, for example, a primer layer.

In an embodiment where the pressure sensitive adhesive layer is discontinuous, the layer may take the form of such shapes as dots (preferably having a diameter of about 1 to about 3 mm), stripes, crescents, and logos. Alternatively, a discontinuous pressure sensitive adhesive layer can be provided as microstructured adhesives or melt-blown non-woven microfibers. For any discontinuous layer of pressure sensitive adhesive layer, it is preferable to use a pattern that minimizes the orientation dependence of the pressure sensitive adhesive characteristics of the adhesive article, for example, peel or shear strength. To minimize orientation dependence, dots, for example, are more preferable than stripes.

The percent coverage of pressure sensitive adhesive in a discontinuous layer also is selected depending on the intended use of the adhesive article, preferably to maximize the overlap shear of an adhesive article with a bonded layer while also providing sufficient initial pressure sensitive adhesive characteristics to hold the adhesive article in place prior to bonding, for example, by heating. Preferably, the surface coverage of the discontinuous pressure sensitive adhesive layer is from about 1 to about 50 %, more preferably from 2 to 19%, and most preferably from 2 to 5%, based on the total surface area.

Alternatively, the pressure sensitive layer may be continuous over an entire major surface of a bondable layer.

Suitable pressure sensitive adhesive materials may comprise acrylics, vinyl ethers, natural or synthetic rubber-based materials, poly(alpha-olefins), and silicones. A pressure sensitive adhesive material is preferably selected for an adhesive article of the present invention so that, upon contact with a bondable layer, pressure sensitive adhesive characteristics of the pressure sensitive adhesive layer are retained as described above.

Acrylics

Useful acrylic pressure sensitive adhesive materials include those comprising at least one copolymerized monofunctional (meth)acrylic acid ester of a nontertiary alcohol in which the alkyl group contains about 4 to 14 carbon atoms (on average) whose homopolymer has a Tg (glass transition temperature) of no greater than about 0° C. and at least one copolymerized monofunctional ethylenically unsaturated reinforcing monomer whose homopolymer has a Tg of at least about 10° C.

The term "(meth)acrylic" as used herein refers to acrylic and methacrylic. The term "monofunctional" in the context of a "monofunctional (meth)acrylic acid ester" refers to a mono-(meth)acrylic monomer or a monomer containing one (meth)acrylic functionality, although other functionality can be present. The term A "monofunctional" in the context of a "monofunctional ethylenically unsaturated reinforcing monomer" refers to a monoethylenically unsaturated monomer or a monomer containing one ethylenically unsaturated functionality, although other functionality can be present. As used herein, "reinforcing monomer" means monomers that increase the modulus of the adhesive and thereby its strength. The alkyl group of the nontertiary alcohol can optionally contain oxygen atoms in the chain, thereby forming ethers for example.

Examples of suitable monofunctional (meth)acrylic acid esters include, but are not limited to, 2-methylbutyl acrylate, 2-ethylhexyl acrylate, isooctyl acrylate, auryl acrylate, n-decyl acrylate, 4-methyl-2-pentyl acrylate, isoamyl acrylate, sec-utyl acrylate, and isononyl acrylate. Preferred (meth)acrylic acid esters that can be sed include, but are not limited to, 2-ethylhexyl acrylate, isooctyl acrylate, lauryl crylate, and 2-methylbutyl acrylate.

Monofunctional reinforcing monomers include, but are not limited to, meth)acrylic acid, a (meth)acrylamide, a (meth)acrylate, an alpha-olefin, a vinyl ther, an allyl ether, a styrenic monomer, or a maleate. Examples of suitable onofunctional reinforcing monomers include, but are not limited to, acrylic acid, methacrylic acid, itaconic acid, maleic acid, fumaric acid, 2-hydroxyethyl acrylate or methacrylate, cyclohexyl acrylate, t-butyl acrylate, phenyl acrylate, isobornyl acrylate, 2-phenoxyethyl acrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N-octyl acrylamide, N-t-butyl acrylamide, N,N-dimethyl acrylamide, N,N-diethyl acrylamide, and N-ethyl-N-dihydroxyethyl acrylamide. Preferred monofunctional reinforcing monomers include, but are not limited to, acrylic acid, t-butyl acrylate, N,N-dimethyl acrylamide, N-octyl acrylamide, isobornyl acrylate, and 2-phenoxyethyl acrylate. Various combinations of reinforcing monomers can also be employed.

The acrylic adhesives may optionally contain various types of crosslinking agents such as, for example, ethylenically unsaturated compounds which in the excited state are capable of abstracting hydrogen, and copolymerizable polyfunctional ethylenically unsaturated monomers. An example of a suitable, optional crosslinking agent is a copolymerizable ethylenically unsaturated compound which in the excited state is capable of abstracting a hydrogen such as, for example, p-acryloxy-benzophenone. Suitable copolymerizable polyfunctional ethylenically unsaturated monomers include, for example, 1,6-hexanediol diacrylate, trimethylolpropane triacrylate, pentaerythritol tetraacrylate, 1,2-ethylene glycol diacrylate and the diacrylate of ethylene oxide modified bisphenol A. Various combinations of crosslinking agents can also be employed.

Exemplary acrylic pressure sensitive adhesives include a water-based acrylic adhesive commercially available from KIWO Inc., Seabrook, Texas, under the trade designation "Kiwoprint D 146/3". Other suitable acrylic pressure sensitive adhesives include those prepared from a copolymer of isooctyl acrylate/acrylic acid/2-poly(styrylethyl methacrylate) macromer as described in U.S. Pat. No. 4,693,776, incorporated herein by reference. An exemplary macromer is commercially available from Sartomer Company, Exton, Pa. under the trade designation "CHEMLINK 4500" (13,000 molecular weight).

Vinyl Ethers

Pressure sensitive adhesives may be made by polymerizing vinyl ether monomers or comonomers or by copolymerizing vinyl ether monomers with acrylic monomers. It is within the scope of this invention to use a blend of more than one vinyl ether resin. The general guidelines for formulating acrylic pressure sensitive adhesives also apply to pressure sensitive adhesives based on vinyl ethers. Cationic curing chemistry is the preferred method of polymerizing vinyl ether monomers. Free radical chemistry may be used to copolymerize vinyl ether monomers with acrylic monomers. Particularly when the pressure sensitive adhesives are made from vinyl ether monomers, antioxidants are added to reduce degradation of the adhesives upon exposure to oxygen, heat, and/or light.

Useful vinyl ether pressure sensitive adhesive materials include those described in "Handbook of Pressure Sensitive Adhesive Technology, $2^{nd}$ Edition, D. Satas, Ed. Van Nostrand Reinhold, New York, 1989, Chapter 17, pages 494–507, incorporated herein by reference.

Examples of commercial available vinyl ethers include triethylene glycol divinyl ether (available from GAF, Wayne, N.J. under the trade designation "Rapicure DVE-3, "), 1,4-cyclohexanedimethanol divinyl ether (available from GAF under the trade designation "Rapicure CHVE"), and resins from Allied Signal, under the trade designation "VEctomer" such as "VEctomer 2010," "VEctomer 2020," "VEctomer4010," and "VEctomer 4020." Other suitable vinyl ether include ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexanedimethanol monovinyl ether, diethyleneglycol divinyl ether, and triethyleneglycol divinyl ether, which are available from BASF Aktiengesellschaft, Ludwigshafen, Germany.

Rubber-Based Materials

Useful rubber-based pressure sensitive adhesives include an elastomeric component and a tackifying resin and, optionally, a crosslinking agent and/or an accelerator.

Suitable elastomeric components include, e.g., natural rubbers, synthetic rubbers such as styrene-butadiene rubber, styrene block copolymers such as styrene-isoprene-styrene, styrene-butadiene-styrene, styrene-ethylene/butylene-styrene, styrene-ethylene/propylene-styrene, and various combinations of such rubbers.

Suitable tackifying resins include resins derived from polymerization of $C_5$ to $C_9$ unsaturated hydrocarbon monomers, terpene resins, and rosin ester resins. Examples of tackifying resins based on a $C_5$ olefin fraction of this type include those commercially available under the trade designations "WINGTACK 95" and "WINGTACK 115" from Goodyear Tire and Rubber Company, Akron, Ohio. Other hydrocarbon based tackifying resins include those commercially available under the trade designations "REGALREZ 1078" and "REGALREZ 1126" from Hercules Chemical Company, Wilmington, Del.; Arkon resins, which include those commercially available under the trade designation "ARKON P115" from Arakawa Forest Chemical Industries, Chicago, Ill.; and resins commercially available under the trade designation "ESCOREZ" from Exxon Chemical Company, Houston, Tex. Suitable terpene resins include terpene polymers, such as polymeric resinous materials obtained by polymerization and/or copolymerization of terpene hydrocarbons such as the alicyclic, monocyclic, and bicyclic monoterpenes and their mixtures. Suitable terpene resins include those commercially available under the trade designation "ZONAREZ B-Series" and "ZONAREZ 7000 Series" from Arizona Chemical Company, Wayne, N.J. Suitable rosin ester tackifying resins include those commercially available under the trade designation "FORAL" and "STAYBELITE" from Hercules Chemical Company, Wilmington, Del. The tackifying resin can contain ethylenic unsaturation; however, saturated tackifying resins are preferred for those applications where resistance to oxidation is important. The amount of tackifying resin typically ranges from about 20 parts to about 70 parts by weight per 100 parts of elastomeric component.

Suitable crosslinking agents for rubber-based adhesives include phenolic resins such as, for example, alkyl phenolic resins, aryl phenolic resins, and halogenated phenolic resins, e.g., brominated phenolic resins. Examples of suitable phenolic resins and their methods of manufacture are described in U.S. Pat. No. 2,987,420, incorporated herein by reference. Examples of suitable alkyl phenolic resins include those commercially available from Schenectady Chemical Inc., Schenectady, N.Y. under the trade designations "HRJ-1367", "HRJ-10518", "HRJ-11331" and "SP-1045". Examples of suitable brominated phenolic resins include those commercially available from Schenectady Chemical Inc., Schenectady, N.Y. under the trade designations "SP-1055" and "SP-1056". The amount of crosslinking agents may range from about 0 to about 90 parts by weight per 100 parts of elastomeric component.

Suitable accelerators may be added to the rubber-based adhesive composition to accelerate crosslinking. Examples of suitable accelerators include zinc salts (e.g., zinc rosinate), tin chloride, and acid accelerators (e.g., stearic acid). The amount of accelerator typically ranges from about 0 to 15 parts by weight per 100 parts of elastomeric component.

Poly(alpha-olefins)

Poly(alpha-olefin) adhesives suitable for use in the present invention comprise one or more monomer units derived from an alpha-olefin monomer that is a liquid at standard temperature and pressure. The monomer preferably is a $C_5$–$C_{30}$ alpha-olefin, more preferably a $C_6$–$C_{20}$ alpha-olefin, most preferably a $C_6$–$C_2$ alpha-olefin. Such monomers optionally can be substituted with conventional substituents that do not interfere with the polymerization of these monomers or with the desired properties of the polymer produced therefrom. The olefin may be linear or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, and 4-methyl- 1-pentene. Blends of one or more of these monomers plus a lower (i.e., $C_{2-4}$) 1-alkene are also within the scope of the present invention. Preferable alpha-olefin monomers are 1-hexene and 1-octene. Suitable alpha-olefin polymers are those described in U.S. Pat. No. 5,112,882, which is incorporated herein by reference.

The alpha-olefin polymer can be a homopolymer, a random copolymer, terpolymer, or tetrapolymer. It can also comprise blocks of homopoly(alpha-olefins) interspersed with monomer units derived from various other copolymerizable monomers. Examples of potentially useful copolymerizable monomers include polyenes such as, for example, the $C_6$–$C_{14}$ alpha-omega-dienes, conjugated dienes, trienes, terpenes, and alkenyl-norbornenes.

The above-described monomers can be polymerized, either in bulk or in one or more inert solvents, in the presence of a catalyst system over a wide range of temperatures, e.g., 0° to 140° C., preferably 30° to 90° C. The amount of catalyst used is preferably in the range of 0.1 to 5 g per kg of monomer. Useful catalyst systems include standard Zn catalysts systems, Zn catalyst systems where the transition metal compound is supported (e.g., on a $MgCl_2$ powder), and Kaminsky-Ewen catalyst systems. All three catalyst systems are well known by those familiar with alpha-olefin polymerizations.

Preferably; the alpha-olefin polymer has a glass transition temperature in the range of −70° to 0° C., more preferably in the range of −60° to −20° C.; an inherent viscosity in the range of 0.4 to 9.0 dL/g, more preferably 0.5 to 6.0 dL/g; and a number average molecular weight in the range of 5,000 to 50,000,000, preferably 50,000 to 5,000,000.

Addition of one or more tackifying resins to the poly (alpha-olefin) can improve tack, lower viscosity, improve coatability, impart heat stability, improve peel adhesion, and enhance shear adhesion (with no concomitant loss of peel adhesion). Where a tackifying resin is used, it can be present in an amount from more than 0 to 150 parts by weight of polymer. Potentially useful tackifying resins which may be used are those described above for use in rubber-based adhesives.

Preferably, the alpha-olefin polymer composition also includes a photocrosslinking agent that is activated by actinic radiation, typically after the polymer is coated. Suitable photocrosslinking agents include, but are not limited to, (a) aldehydes, such as benzaldehyde, chromophore-substituted acetaldehyde, and derivatives thereof, (b) ketones, such as acetophenone, benzophenone, and derivatives thereof, which include those commercially available under the trade designation "SANDORAY 1000" from Sandoz Chemicals, Inc., Charlotte, N.C.; (c) quinones; such as the benzoquinones, anthraquinone, and derivatives thereof; (d) thioxanthones, such as 2-isopropylthioxanthone and 2-dodecylthioxanthone; and (e) chromophore-substituted vinyl halomethyl-sym-triazines, such as 2,4-bis (trichloromethyl)-6-(4-methoxyphenyl)-s-triazine, and 2,4-bis(trichloromethyl)-6-(3,4-dimethoxyphenyl)-s-triazine. Because many such triazines produce HCl upon activation, the addition of a basic compound to the polymeric composition can be beneficial. The photoactive crosslinking agent can be present in a range from about 0.005 to about 2% by weight, preferably from about 0.01 to about 0.5% by weight, more preferably from about 0.05 to 0.15% by weight of the polymer.

Silicones

Useful silicone pressure sensitive adhesive materials include those described in "Handbook of Pressure Sensitive Adhesive Technology, $2^{nd}$ Edition, D. Satas, Ed. Van Nostrand Reinhold, New York, 1989, Chapter 18, pages 508–517, incorporated herein by reference.

Silicone pressure sensitive adhesives are well known in the art. Silicone adhesives are, in general terms, blends of (i) polydiorganosiloxanes (also referred to as "silicone gums" typically having a number average molecular weight of about 5000 to about 10,000,000 preferably about 50,000 to about 1,000,000) with (ii) copolymeric silicone resins (also referred to as "MQ resins" typically having a number average molecular weight of about 100 to about 1,000,000, preferably about 500 to about 50,000 number average molecular weight) comprising triorganosiloxy units and $SiO_{4/2}$ units. Preferably, silicone adhesives comprise from about 20 to about 60 parts by weight silicone gum and, correspondingly, from about 40 to about 80 parts by weight of an MQ resin. It is beneficial, in terms of improving adhesive properties, to provide a chemical means of reacting the copolymeric silicone resin with the polydiorganosiloxane. To achieve such a reaction, two different reaction chemistries have been commonly used; condensation chemistry and addition-cure chemistry.

Silicone adhesives based on condensation chemistry can be prepared by admixing silanol functional copolymeric resins comprising triorganosiloxy units and $SiO_{4/2}$ units with silanol-endblocked polydiorganosiloxanes as described in U.S. Pat. Nos. 2,736,721; 2,814,601; 4,309,520; 2,857,356; and 3,528,940; and Great Britain Pat. No. 998,232, all of which are incorporated by reference. Such blends, which are usually a solvent solution of copolymeric silicone resin and polydiorganosiloxane, as used in the art, are generally applied to a backing, heated to remove solvent, and crosslinked, if necessary, to improve the physical properties of the adhesive.

A silicone adhesive comprising the intercondensation product of a silanol functional polydiorganosiloxane and a silanol functional copolymeric silicone resin, as discussed above, can optionally include a free radical polymerization catalyst, such as a diaryl peroxide crosslinker, to crosslink the adhesive composition, thereby improving the high temperature shear properties of the adhesive with only a slight loss in peel adhesion as taught in The Handbook of Pressure-Sensitive Adhesive Technology, (Satas, 1982), p. 348, incorporated herein by reference. When a peroxide crosslinker is present in a solution of silicone adhesive, the adhesive is generally applied to a backing, heated moderately to volatilize the solvent, and the dried adhesive is heated further to temperatures in the range of 150° C. to about 250° C. to activate the crosslinker as described in U.S. Pat. No. 4,039,707, incorporated herein by reference. In applications where adhesive performance at elevated temperature is not required, the crosslinking agent may be omitted.

The polydiorganosiloxanes used in the preparation of the silicone adhesive component of the instant invention can include any of the common structures and accompanying functionalities known in the art, including polydimethylsiloxane polymers and poly(dimethylsiloxane/diphenylsiloxane) copolymers.

The copolymeric silicone resins useful in the preparation of the silicone adhesive component of the present invention include any of the common structures recited in the above references which include copolymeric silicone-resins having one or more of the following functionalities: silicon-bonded hydrogen, silicon-bonded alkenyl, and silanol. Other useful silicone resins include three component terpolymers comprising $R_3SiO_{1/2}$, $SiO_{4/2}$, and $R_2SiO_{3/2}$ structural units, (also referred to as "MQD resins") wherein R is selected from the group consisting of alkyl radicals comprising 1 to 3 carbon atoms and phenyl radical, and wherein the ratio of $R_3SiO_{1/2}$ units to $SiO_{4/2}$ is between about 0.6 and about 0.9 inclusive as described in U.S. Pat. No. 2,736,721, which is incorporated herein by reference, and which comprise $R_3SiO_{1/2}$, $SiO_{4/2}$, and $R_2SiO_{3/2}$ structural units (also referred to as "MQT resins").

Silicone adhesives prepared by addition-cure chemistry generally comprise polydiorganosiloxanes having alkenyl groups, copolymeric silicone resins comprising $SiO_{4/2}$ and $R_3 SiO_{1/2}$ structural units wherein R is as defined previously having one or more of the following functionalities: silicone-bonded hydrogen, silicone bonded alkenyl groups such as those selected from the group consisting of vinyl, allyl, and propenyl; or silanol, optionally a crosslinking or chain extending agent, and platinum or other noble metal hydrosilation catalyst to effect the curing of the silicone adhesive. Examples of such compositions are described in U.S. Pat. Nos. 3,527,842; 3,983,298; and 4,774,297; and European Patent Publication Nos. 355,991, and 393,426, all of which are incorporated herein by reference.

Blends of silicone pressure sensitive adhesives are also useful. Examples include blends of two different dimethylsiloxane-based pressure sensitive adhesives, as described in The Handbook of Pressure-Sensitive Adhesive Technology (Satas, 1982), p. 346, incorporated herein by reference, or blends of dimethylsiloxane-based pressure sensitive adhesives with dimethylsiloxane/diphenylsiloxane-based pressure sensitive adhesives as descibed in U.S. Pat. No. 4,925,671, incorporated herein by reference.

Examples of commercially available silicone pressure sensitive adhesives include but are not limited to those available from Dow Corning, Midland, Mich., under the trade designations "280A," "282," "Q2-7406," and "Q2-7566"; those available from General Electric, Schenectady, N.Y., under the trade designations "PSA 590," "PSA 600," "PSA 595,""PSA 610," "PSA 518" "PSA 6574" and "PSA 529"; those available from Shin-Etsu, Akron, Ohio, under the trade designations "KR-100P," "KR-100,", and "KR-101-10"; and those available from Rhodia, Rock Hill, S.C., under the trade designation "Rhodorsil 353," "Rhodorsil 354," "Rhodorsil 356," and "Rhodorsil 395."

Optional Additives for the Pressure Sensitive Adhesive Material

Optionally, the pressure sensitive adhesive materials may also include minor amounts of additives. Such additives may include pigments, dyes, plasticizers, fillers, stabilizers, UV radiation absorbers, antioxidants, processing oils, and the like. The amount of additive(s) used can vary from 0.1 to 50 weight percent of the pressure sensitive adhesive material, depending on the end use desired. Any additive(s) used preferably do not significantly absorb radiation near the wavelength of maximum absorption of any photocrosslinker included in the polymer composition.

Optional Components for the Adhesive Article

A backing may be used on one side of the adhesive article, attached directly to the bondable layer or attached to a pressure sensitive adhesive layer. Suitable backings that continue to function as backings after the heat bonding cycle are generally used. Examples of suitable backings include metallic foils such as foils of aluminum, brass, or copper; and polymer films such as those made from polyester, polyimide, or polyolefin.

A release material may be coated onto at least one layer of the adhesive article, for example, a bondable layer, to form a low adhesion backsize (LAB). Alternatively, a release liner having differential release characteristics may be employed on one or both sides of the adhesive article. Suitable release materials for use as LAB and release liners are well known to those skilled in the art and include silicones and fluoropolymeric materials. For veneer applications, it is preferred to use a release liner, such as, for example, a silicone-treated paper release liner having a thickness of, for example, 76.2 micrometers (0.003 inches).

The thickness of the release material may be varied within a very wide range and depends on the end application. The release (i.e., adhesion) value of an adhesive to the release material may vary to some degree depending on the thickness of the release material.

Method of Making An Adhesive Article

A method of making an adhesive article of the present invention includes selecting a bondable material to form the bondable layer. A pressure-sensitive adhesive material may be selected such that upon interaction with the bondable layer, the pressure sensitive adhesive will retain pressure sensitive adhesive characteristics after storage. Generally, the pressure sensitive adhesive layer of an adhesive article of the present invention retains pressure sensitive adhesive characteristics for the duration of the usable life of the bondable layer. Regardless of the usable life of the bondable layer, the pressure sensitive adhesive layer of the present invention typically retains pressure sensitive adhesive characteristics after storage at room temperature for at least 3 months, preferably at least six months, and more preferably at least 12 months. Preferably, the pressure sensitive adhesive layer retains pressure sensitive adhesive characteristics after storage at 38 to 42° C. for at least about 20 days. The pressure sensitive adhesive is then provided on a major surface of the bondable layer to form a pressure sensitive adhesive layer.

If it is necessary to make the bondable layer, rather than using a commercially available product which can be used as a bondable layer, the bondable layer may made by mixing the desired components using a mixing method that does not compromise the latency of any curative used.

When a thermosetting material is used, any coating method for forming the layer as a film may be chosen such that it does not interfere with the latency of any curative used. For example, a thermosetting layer can be made by melt-mixing the thermosetting material, curative, and any other desired additives, at a temperature below the temperature at which the curative will be activated. The warm mixture can then be made into film form by casting onto a suitable release liner using a hot knife-over-bed type coater.

A pressure sensitive adhesive layer is then selected. The pressure sensitive adhesive may directly coated onto the bondable layer or coated onto a temporary liner so that it can then be transfer laminated to the bondable layer.

When a discontinuous pressure sensitive adhesive layer is desired, a pressure sensitive adhesive composition can be prepared in many forms that facilitate its application as a discontinuous layer to the bondable layer. For example, the pressure sensitive adhesive composition can be made suitable for printing, for example, screen printing. Alternatively, the pressure sensitive material can be coated onto a structured liner as described in WO 98/29516A, incorporated herein by reference.

Alternatively, the pressure sensitive adhesive material may be made into a non-woven web of melt-blown microfibers by any suitable process, which may be a spunbond process or a melt-blown process, well known in the art, for example, as described in "Superfine Thermoplastic Fibers" by Wente in *Industrial Engineering Chemistry*, Vol. 48, pages 1342 et seq. (1956); Report No. 4364 of the Naval Research Laboratories, published May 25, 1954, entitled "Manufacture of Superfine Organic Fibers" by Wente et al.; as well as in International Publication No. WO 96/23915, and U.S. Pat. Nos. 3,338,992; 3,502,763; 3,692,618; and 4,405,297, all of which are incorporated by reference. A preferred method for the preparation of fibers, particularly microfibers, and nonwoven webs thereof, is a melt-blown process. For example, nonwoven webs of multilayer microfibers and melt-blown processes for producing them are described in U.S. Pat. Nos. 5,176,952; 5,232,770; 5,238,733; 5,258,220; and 5,248,455, all of which are incorporated by reference.

One method of achieving a continuous pressure sensitive adhesive layer is to coat a continuous adhesive film onto a release liner and then laminate the pressure sensitive adhesive side of the pressure sensitive adhesive/release liner construction to a bondable thermosetting layer. An alternative method of achieving a continuous pressure sensitive adhesive layer is to coat a continuous adhesive film onto a bondable thermosetting layer and then to optionally laminate a release liner to the pressure sensitive adhesive side of the pressure sensitive adhesive/bondable layer construction.

The pressure sensitive adhesive layer and the bondable layer are preferably selected so that the pressure sensitive adhesive layer retains pressure sensitive adhesive characteristics as defined above.

It may be desirable to incorporate one or more layers of nonwoven fibers, also known as scrims, as part of the adhesive article. The scrim can be placed inside the bondable layer during its production to provide greater dimensional stability to the adhesive article before bonding. When the bondable layer is made with pressure sensitive adhesive on only one side, the scrim can be laminated to the side of the bondable layer opposite the side with the pressure sensitive adhesive layer.

It is also possible to apply the adhesive article onto a single substrate for use as a protective coating and/or a seam sealer. For this type of application, an adhesive article with a pressure sensitive adhesive layer on at least one side can be placed over the seam or area to be protected, with the pressure sensitive adhesive layer in contact with the substrate.

After the adhesive article has been prepared and heat is applied, the bondable layer becomes a bonded layer as described above. Depending on the desired application, a release liner or release material as described above may be employed on the adhesive article to allow usability as a tape. A tape can also be formed by employing a backing with an adhesive article in accordance with the present invention.

In any embodiment having a discontinuous layer, it is preferably that the adhesive article have, after bonding, an overlap shear strength of at least about 6.9 MPa, in accordance with ASTM D-1002-94, at room temperature (approximately 23° C.±3° C.) and the bondable layer may be selected to give the adhesive article this property.

Method of Using An Adhesive Article

An adhesive article of the present invention can be used to form an assembly by bonding an adhesive article of the present invention to any of a variety of substrates such as metals including aluminum and aluminum alloys, stainless steel, cold-rolled steel, steel, galvanized steel, coated steel, titanium, brass; plastics and plastic composite materials that can survive a heat bonding cycle such as those based on epoxides, polyesters, polyamides, polyimides, cyanate esters, phenolics, and other engineering thermoplastics such as polycarbonate, poly(ether-ether) ketone, and poly(ether sulfone); ceramics; glass; wood such as oak, cherry, maple, pine, mahogany, ash, walnut, teak, hickory, birch, obeche, satinwood, and poplar; wood veneers; and corestock (also referred to throughout as "coreboard"), which is a generic term for the central core of a veneer panel and includes, for example, particle board (made from wood scraps, chips, shavings, and sawdust), battenboard (solid core strips), hard board (superfine wood fibers bonded together under high temperature and pressure), and plywood.

The adhesive article may be applied or attached to a substrate and then another substrate can be applied thereto. Specifically, the pressure sensitive adhesive layer of the adhesive article may be applied to a substrate. Another substrate can then be applied to the side of the bondable layer opposite the pressure sensitive adhesive layer. Alternatively, the bondable layer may have another layer of pressure sensitive adhesive on the side opposite the first layer of pressure sensitive adhesive. The second substrate may be adhered to the second layer of pressure sensitive adhesive layer.

When the adhesive article has been made with scrim laminated to one side of a bondable layer that has a pressure sensitive adhesive layer on the opposite side, the scrim ensures that a second substrate can easily be slid across the adhesive article, after the pressure sensitive adhesive layer has been used to bond the adhesive article to a first substrate (forming a first assembly). The second substrate may itself comprise an adhesive article having a scrim to form a second assembly (which may be identical to the first assembly); in which case the first and second assemblies are bonded scrim to scrim. The external scrim can be used to prevent any slight tack of the bondable layer from making it difficult to slide a second substrate into position for bonding.

The bondable layer may then be bonded in any manner described above as understood by one skilled in the art. Bonding is described, for example, with reference to application of heat. The heating cycle required will depend upon the choice of bondable layer. The adhesive article with at least one substrate may require the use of clamping during heating depending upon the bondable layer chosen. The choice of heating cycle also depends on the bondable layer chosen and is selected to maintain the adhesive article at a suitable temperature for sufficient time to provide acceptable bond strength. If a thermosetting bondable layer is used, the temperature and time must be sufficient to provide substantial bonding or cure of the thermosetting material.

Examples of heating methods that can be used include convection oven, direct contact-heaters such as a heated press or hot-bar bonder, induction, infra-red, and microwave.

Exemplary induction can be accomplished by any conventional method. The power of the induction heating system is selected based upon the specific application. Those skilled in the art of providing induction heating systems are capable of providing a system for specific substrates to bond the bondable layer.

A suitable induction apparatus may comprise a flexible, reshapeable cable assembly operably positionable adjacent a substrate wherein the a flexible, reshapeable cable assembly is capable of being manually shaped and re-shaped in accordance with the adhesive article and substrate(s) to be bonded, as described in U.S. Pat. No. 6,288,375, Issued Sep. 11, 2001 and entitled "Conformable Loop Induction Heating Apparatus And Method For Accelerated Curing Of Bonded Members," incorporated herein by reference.

Another suitable induction apparatus may comprise a portable induction heating apparatus, having a hand holdable induction heating member that can be held, operated and controlled with one hand and operated remotely from the control unit, can be used, as described in International Patent Application Serial No. PCT/US00/27835, Portable Induction Heating Apparatus And Method Including A Hand Holdable Induction Heating Member," incorporated herein by reference.

The adhesive article may be used to prepare assemblies such as a protection for a pipe weld; to form a panel bond, for example, attaching or reattaching a substrate such as an outer vehicle body panel to another outer vehicle body panel, or attaching or reattaching a vehicle inner structure to an outer vehicle body panel, by means of an adhesive article; or to seal a seam, for example, sealing a seam created at the union of two outer vehicle body panels or a union of an outer vehicle body panel and the vehicle inner structure.

One method of using an adhesive article of the present invention is in a veneering process that is currently practiced in the furniture industry. The decorative wood species desired by consumers, such as oak, maple, cherry, and others, are expensive and thus are most commonly used in the form of thin veneers about 0.8 mm (0.03 in) thick. The veneering process is used to assemble furniture with thin wooden veneer pieces (also known as leaves) of various wood species and grain patterns covering a thicker (e.g., 0.63 to 1.9 cm=0.25 to 0.75 inches), dimensionally stable, less expensive structural coreboard, such as particle board. The pieces are often arranged in a side-by-side relationship and, together with the structural core board, form a composite panel having a veneer surface. Those panels which have complex shapes of veneer pieces are known as "fancy face" veneered surface panels.

In using an adhesive article of the present invention in a veneer application the individual veneer pieces are positioned on the pressure sensitive adhesive surface and held in place by the pressure sensitive adhesive.

In one embodiment, the veneer pieces with an adhesive article may then be placed on a structural coreboard (e.g., particle board) with the bondable layer in contact with the structural coreboard. This construction is then subjected to the selected temperature and pressure which is appropriate to activate the bondable layer. Upon activation, the veneer pieces are permanently adhered to the coreboard.

In another embodiment, the veneer pieces with an adhesive article may be placed on a thin (e.g., 0.8 mm=0.03 inches), less expensive wood core such as poplar and then subjected to the selected temperature and pressure which is appropriate to activate the bondable layer. Upon activation, the veneer pieces are permanently adhered to the thin core. This bonded construction of veneer pieces, an adhesive article, and thin core is then bonded to a thicker, dimensionally stable, less expensive structural coreboard (described above) using, for example, the adhesive article of the present invention as described for the previous step, or an adhesive glue. As used herein, a "layup" refers to veneer on top of corestock or coreboard with an adhesive article therebetween before being subjected to temperature and pressure.

If a glue is employed, the thick coreboard is run through a roll coater that applies glue to the surface of the board. The bonded construction of veneer pieces, an adhesive article, and thin core prepared previously is positioned on the glued board and then pressed to the board, using either a cold press or a hot press. If a cold press is used, the glue is commonly a water-based vinyl type adhesive which typically cures at, or slightly above, normal room temperature. For a hot press, the glue typically is a synthetic resin(s), often supplied with various resin and catalyst combinations, or a urea formaldehyde type of glue. Cold press conditions generally are in excess of 0.7 MPa (100 psi) for 45 minutes to 48 hours at room temperature (20° C. (68° F.)). Hot press conditions typically range from a minimum of 30 seconds to 10 minutes at temperatures in the range of 121° C. to 163° C. (250° F. to 325° F.) at 0.5 MPa to 1.7 MPa (75 psi to 250 psi).

Use of the adhesive article of the present invention in the veneering process eliminates the current need for adhesive tape on the outer surface of the many individual veneer pieces to hold them in position until a permanent bond between the veneer assembly and the thin or thick coreboards is formed. As a result, the now common process step of removing the adhesive tape from the outer veneer surface is eliminated. Since this step is labor intensive and often requires sanding steps which sometimes lead to loss of finished product due to oversanding, there is provided a significant cost savings in the veneering process.

EXAMPLES

Test Methods

The following test methods were used to evaluate the examples described below.

Overlap Shear Test

Samples were tested according to ASTM D-1002-94 and AECMA EN 2243-1 (August 1980), using 2024-T3 clad aluminum substrates having dimensions of 25.4 mm×101.6 mm×1.6 mm. The overlap area was 12.7 mm by 25.4 mm. The grip separation rate was 2.5 mm/min. Testing occurred at 23±3° C. (abbreviated herein as room temperature or as "RT"), at 80° C., and after conditions of 750 hours at 70° C. and 95% relative humidity (abbreviated as "RH") (these conditions are designated as "hot/wet aging").

Unless otherwise noted, a sample was first heat bonded in a heated press under light contact pressure (10 kPa) for 60 minutes at 125° C., with a heat-up rate from room temperature of 3.5° C./minute and then cooled prior to removal from the press.

A different heat bonding cycle was used in Example 7, that is, light contact pressure for 60 minutes at 175–185° C. with heat-up rate of 5° C./min, and a different heat bonding cycle was used in Examples 19 and 20, that is, 50 kPa pressure for 5 minutes at 180° C.

Floating Roller Peel Adhesion Test

Samples were tested according to ASTM D3167-93 and AECMA EN2243-2 (August, 1980), using 2024-T3 clad aluminum substrates. During the test, a substrate of 0.5 mm thickness was peeled from a substrate of 1.6 mm thickness, both substrates having a width of 25.4 mm. A grip separation rate of 150 mm/min was used. Testing occurred at RT and 80° C.

Unless otherwise noted, a sample was heat bonded in a heated press under light contact pressure (10 kPa) for 60 minutes at 125° C., with a heat-up rate from room temperature of 3.5° C./minute and then cooled prior to removal from the press. An alternate heat bonding cycle was used in Example 7 as follows: light contact pressure for 60 minutes at 175–185° C. with heat-up rate of 5° C./min.

90 Degree Peel Test Method

This method was used to test adhesive articles prior to performing the heat bonding step. Testing was done according to the Pressure Sensitive Tape Council's method "Peel Adhesion for Single Coated Pressure Sensitive Tapes at a 90 Degree Angle", using a specimen width of 2.54 cm, a peeled length of at least 10 cm, and a grip separation rate of 30.5 cm/min. Prior to testing, a 127 micron thick undyed/unsealed aluminum matte foil was applied as a backing (commercially available as L24605-00 from Lawrence and Frederick, Inc., Streamwood, Ill.). The unbonded adhesive article with backing was peeled after a 1 minute dwell time from a Type 304-2BA cold-rolled bright-annealed smooth-bright finish stainless steel panel).

Impact Resistance Test

Samples were tested according to ASTM D-950-94 and AFNOR 76-1151 (August 1980), using a Zwick impact tester (commercially available from Zwick, Ulm, Germany) and 2024-T3 unclad aluminum substrates. The bottom block had dimensions of 35 mm by 35 mm by 8 mm. The top block had dimensions of 25 mm by 25 mm by 8 mm. The hammer size was 50 joules and had an impact speed of 3.85 m/sec. Samples were tested room temperature and −40° C.

Unless otherwise noted, a sample was first heat bonded in a heated press under light contact pressure (10 kPa) for 60 minutes at 125° C., with a heat-up rate from room temperature of 3.5° C./minute and then cooled prior to removal from the press.

Aging Stability (Before Bonding)

The reaction exotherm of an aged unbonded samples was determined according to ASTM E537-86. The reaction exotherm of the aged sample was compared to the reaction exotherm of a non-aged unbonded sample. Aging at 38–42° C. was done by packing the samples into a watertight metallic container and immersing the container into a water bath with a temperature controlled to 40+/−2° C. This was done to provide better temperature control than could be obtained in a typical oven. The result was subtracted from 1 and multiplied by 100 to give the "percent conversion" of the aged sample.

The test results can be evaluated as follows: If the percent conversion of the sample was approximately 0%, the heat bonded performance of the aged sample may be assumed to be equivalent to that of a non-aged sample. If the percent conversion was more than 0%, it may be necessary to couple this test with measurements of heat bonded performance to determine if the adhesive article is still suitable for use. Typically, percent conversions of up to 10% or more are acceptable. The acceptable percent conversion will depend upon the specific adhesive article tested and on the specific properties of the adhesive article that are required for it to be suitable for its intended use.

Sugar Tack Test

This test provides a semi-quantitative method of measuring tack when the tack level is too low to resolve differences by a probe tack test, or when differences in the stiffness or thickness of adhesives articles would make it difficult to compare samples by a peel test such as a 90° angle degree peel test. The samples were aged at ambient conditions (20 to 30° C. and 30 to 80% relative humidity).

In this test, a piece of each material to be compared, approximately 2.54 cm by 2.54 cm, was attached to a manila folder-weight card using double-sided tape. Approximately 25 milligrams of granulated sugar, available from Crystal Sugar, Minneapolis, Minn., was dropped onto each square from a height of approximately 1 centimeter. No pressure was applied to press the sugar onto the adhesive. The card was then held vertically, and tapped three times on a hard surface. The amount of sugar remaining was recorded. Next, a soft artist's brush, available from Fisher Scientific, Pittsburgh, Pa. under the trade designation "NC9592694" was used to attempt to remove any remaining sugar. The sample was brushed three times in one direction and three times in a reverse parallel direction. The amount of sugar remaining was visually observed and the percent was estimated by eye and recorded. Results were graded according to the following scale.

| Sugar Tack Test Scale | |
|---|---|
| Result | Grade |
| >95% of sugar removed by tapping alone | 1T |
| >75% of sugar removed by tapping alone | 2T |
| >50% of sugar removed by tapping alone | 3T |
| <5% of sugar removed by tapping alone | 4T |
| <5% of sugar retained after brushing | 1B |
| >50% of sugar retained after brushing | 2B |
| >75% of sugar retained after brushing | 3B |
| >95% of sugar retained after brushing | 4B |

When bonded films were tested, the films were first bonded between two sheets of release coated polyester using an exhausted oven with a ramped heating rate of 2° C./min from approximately 50° C. to a temperature of 150° C., followed by a 30 minute hold at 150° C. The bonded films were allowed to cool completely prior to testing. When the pressure sensitive adhesive layer was discontinuous, the percent of sugar retaining was calculated relative to the surface area covered by the pressure sensitive adhesive.

A sample of Control I was aged at 25° C. for 30 days and a second sample was aged at 66° C. for 48 hours.

A sample of Example 21 was aged at 25° C. for 30 days, a second sample was aged at 66° C. for 48 hours, and a third sample was aged at 66° C. for 120 hours.

Controls B, C, D and E were then separately tested by placing several drops of isopropyl alcohol (IPA) on the sample and then allowing it to dry at room temperature for at least 2 hours before sugar tack was measured. This test is referred to as "After IPA Exposure." In addition, several drops of a solution of 1 weight percent of 4,7,10-trioxa-1,13-tridecane diamine (available from Aldrich Chemical, Milwaukee, Wis.) in isopropyl alcohol (Amine/IPA) were placed on Controls B, C, D and E and then at least 8 hours was allowed to elapse before the sugar tack was measured. This test is referred to as "After Amine/IPA Exposure."

Finger Tack Test of Bonded Adhesive Article

The adhesive article was placed between two sheets of release-coated polyester liner. Unless otherwise noted, a sample was first heat bonded in a heated press under light contact pressure (10 kPa) for 60 minutes at 125° C., with a heat-up rate from room temperature of 3.5° C./minute and then cooled prior to removal from the press. After the heat bonding cycle was complete, the release liner was removed and an ungloved finger was pressed with moderate pressure onto the adhesive article. The qualitative level of tack (evaluated in a range from, in increasing order, no tack, to slightly tacky, to tacky, to very tacky) which was detected upon removal of the finger was noted.

Pencil Hardness Test

Pencil Hardness testing was performed, according to the method described in "Surface Coatings: Science and Technology" by S. Paul, 1985, page 485, using pencils manufactured by Staedtler Inc., Chatsworth, Calif. The portion of the hardness scale that was used is listed below, in order of increasing hardness:

6B 5B 4B 3B 2B HB F H 2H 3H

When bonded films were tested, the films were first bonded between two sheets of release coated polyester using a vented oven with a ramped heating rate of 2° C./min from approximately 50° C. to a temperature of 150° C., followed by a 30 minute hold at 150° C. The bonded films were allowed to cool completely prior to testing. When the pressure sensitive adhesive layer was discontinuous and the size of the areas of pressure sensitive adhesive were large compared to the size of the pencil tip, the test was done in the area covered by the pressure sensitive adhesive. The results were not affected by the test having been done on a sample with a discontinuous layer of pressure sensitive adhesive.

FTIR (Fourier Transform Infrared Spectroscopy)

Infrared (IR) spectra of the surface were obtained by attenuated total reflectance (ATR) using a vertical, variable angle (set to 45 degree) Ge crystal (3 inches long by ~0.25 inches wide) on a Nicolet Magna 750 FTIR spectrometer (commercially available from Nicolet Instrument Corporation, Madison, Wis.). The sample was applied to both sides of the Ge crystal for a contact length of ~6 inches. The spectra were acquired at 4 $cm^{-1}$ resolution and 128 scans were co-added. The penetration depth at 1660 $cm^{-1}$ with a Ge crystal was ~0.4 microns, assuming the refractive index of the sample was 1.5.

IR spectra of the surface of discontinuous pressure sensitive adhesive layers were obtained by ATR using a ZnSe objective on a Nic-Plan microscope attached to a Nicolet Magna 750 FT-IR spectrometer. The spot size of the ZnSe crystal was ~50 microns. The penetration depth at 1660 $cm^{-1}$ with a ZnSe crystal was ~1.21 micron, assuming the refractive index of the sample was 1.5. The spectra were acquired at 4 $cm^{-1}$ resolution and 128 scans were co-added. The results obtained for a discontinuous layer of pressure sensitive adhesive were the same as would have been obtained for a continuous layer of pressure sensitive adhesive provided that the size of the pressure sensitive adhesive area was large compared to the spot size of the ZnSe crystal.

The samples tested comprised an acrylic pressure sensitive adhesive layer on an epoxide-based bondable layer. The pressure sensitive adhesive layer individually and the epoxide bondable layer individually were tested to show that there was no detectable peak at 1510 $cm^{-1}$ in the pressure sensitive adhesive layer by itself and no detectable peak at 1732 $cm^{-1}$ in the bondable layer by itself.

The height of the peak centered at 1510 $cm^{-1}$ (corresponding to the C-H stretch of phenyl rings, and assumed to be associated with the phenyl rings of the epoxide component of the bondable layer) was calculated and the ratio of the height of this peak to the height of the peak centered at 1732 $cm^{-1}$ (corresponding to the carbonyl group present in the acrylic component of the pressure sensitive adhesive layer) was calculated. This ratio, measured at the outer surface of the pressure sensitive adhesive layer, served as a potential indication of the amount of diffusion of at least one migratory component from the bondable layer into the pressure sensitive adhesive layer.

Manual Peel Strength (Veneer)

An adhesive article, with a release liner, used in the assembly of fancy face veneers of walnut, mahogany and maple wood species having various grain patterns was tested for peel strength. First, the release liner was removed from the pressure sensitive adhesive side of the article, which measured 6.45 cm×12.7 cm (4 inches×5 inches). A construction of several irregularly-shaped, fitted veneer pieces were then placed on the exposed pressure sensitive adhesive surface such that they also formed a rectangle measuring 6.45 cm×12.7 cm, thus covering the entire pressure sensitive adhesive surface and being held in place by it. This construction is referred to as a "layup". This layup was then placed and centered on a sheet of poplar backing, measuring 6.45×12.7 cm such that the heat bondable layer and poplar backing contacted each other. The resulting construction was placed in a press between two platens which had been preheated to 162° C., and a pressure of 0.86 MPa (125 psi) was applied. The temperature and pressure were maintained for 4 minutes. The heat bonded construction was then removed from the press and allowed to cool to room temperature (i.e, 25° C. (77° F.)). This heat bonded article was evaluated by manually attempting to separate the veneer pieces from the poplar backing.

Overlap Shear Strength (Veneer)

The overlap shear strength of two composite veneer pieces bonded together using an adhesive article of the present invention was measured. First, two composite veneer pieces were made as follows. A cherrywood veneer composite was prepared by bonding three pieces of cherrywood veneer, each measuring approximately 2.5 cm×10 cm×0.08 cm (1 inch×4 inches×0.031 inches), together using a layer of heat bondable phenolic film, commercially available from Dyno Overlays Inc, High Point, N.C. under the trade designation "Phenolic Glue Film" (nominal thickness of 127–140 $\mu$m) between the first and second, and second and third pieces of veneer to form a "layup". This layup was placed in a press between two platens which had been preheated to 162° C., and a pressure of 0.86 MPa (125 psi) was applied. The temperature and pressure were maintained for 4 minutes. This construction was then removed from the press and allowed to cool to room temperature (i.e, 25° C. (77° F.)) to give a cherrywood veneer composite piece.

Two cherrywood veneer composite pieces were bonded together using an adhesive article of the present invention by placing them in an overlapping configuration with each other such that they were aligned, end-to-end in the lengthwise direction, with an overlap area of 2.5 cm×2.5 cm. A piece of the adhesive article of the present invention measuring 2.5 cm×2.5 cm, was placed between the two composite pieces in the overlapping area. This layup was placed in a press between two platens along with two additional cherrywood veneer composite pieces. One of the additional pieces was positioned under the upper composite piece of the overlap sample such that it abutted the lower composite piece of the overlap sample and supported the upper composite piece during the heat bonding cycle. The other additional piece was positioned on top of the lower composite piece of the overlap sample such that it abutted the top composite piece of the overlap sample. The platens, which had been preheated to 162° C., were closed and a pressure of 0.86 MPa (125 psi) was applied. The temperature and pressure were maintained for 4 minutes. The heat bonded overlap shear sample was then removed from the press and allowed to cool to room temperature (i.e, 25° C. (77° F.)).

The overlap shear strength of the resulting sample was evaluated at 25° C. by placing each end of the overlap shear sample in the jaws of an Instron Tensile Tester (Model No. 4204, available from Instron Corporation, Canton, Mass.) with the overlap area centered between the jaws. The distance between the jaws was 10 cm (4 inches) and the separation rate was 1.3 cm min. (0.51 inches/min.).

EXAMPLE PREPARATION

Examples were prepared as described below. Comparative Examples are indicated in the Results section with the designation "C. E.". The Results section indicates which Test Methods were performed for a given example.

Example 1

An aqueous acrylate dispersion at 60.5 weight percent solids, available from KIWO Incorporated, Seabrook, Tex. under the trade designation "Kiwoprint D 146/3", was printed through a silk screen onto a silicone-treated paper liner to give a uniform pattern of discontinuous dots. After drying on a web moving at 2.5 m/min through progressive zones, each zone having a length of two meters, at temperatures of 50° C., 70° C., and 80° C., respectively, pressure sensitive adhesive dots having a diameter of approximately 3.0 to 3.2 millimeters and a thickness of 25 to 30 micrometers were obtained in a repeating, uniform grid-like pattern having columns (y-direction) and rows (x-direction). The dots had a center-to-center distance of 7.5 mm in the y-direction and a center-to-center distance of 15 mm in the x-direction between every other column. Adjacent columns of dots were offset by 3.7 mm in the y-direction from each other and, in the x-direction, were spaced equidistant from the closest columns on either side.

A sample of this sheet, measuring approximately 12.7× 100 cm was used to transfer laminate the pressure sensitive adhesive dots to both major surfaces of a layer of a thermosetting, modified epoxy structural adhesive in film form having a weight of approximately 147 g/m$^2$, available from 3M, St. Paul, Minn. under the trade designation "Scotch-Weld Structural Adhesive Film AF 163-2L". Transfer lamination was carried out by the use of nip rollers.

Example 2

A sample was prepared in accordance with Example 1 with the following modification. A thermosetting, modified epoxy adhesive film having a weight of approximately 220 g/m$^2$, available from 3M under the trade designation "Scotch-Weld Structural Adhesive Film AF 3109-2K" was employed as the bondable layer.

Example 3

A sample was prepared in accordance with Example 1 with the following modification. A thermosetting, supported, non-volatile, modified epoxy adhesive having a weight of approximately 293 g/m$^2$, available from 3M under the trade designation "Scotch-Weld Structural Adhesive Film AF 126-2" was employed as the bondable layer.

Example 4

A sample was prepared in accordance with Example 1 with the following modification. A thermosetting, supported, modified epoxy film adhesive having a weight of approximately 391 g/m$^2$, available from 3M under the trade designation "Scotch-Weld Structural Adhesive Film AF 111" was employed as the bondable layer.

Example 5

A sample was prepared in accordance with Example 1 with the following modification. A core/shell toughened, thermosetting epoxy film was employed as the bondable layer. This layer was prepared in the following manner.

30 parts by weight (pbw) of a blend of diglycidyl ether of bisphenol F and diglycidyl ether of bisphenol A in a weight ratio of 55:45 having an equivalent weight of 176, available from Shell Chemical Co., Pernis, The Netherlands, under the trade designation "Epikote 232" and 70 pbw of a solid epoxy resin having an equivalent weight of 475, available from Shell Chemical Co., Pernis, The Netherlands, under the trade designation "Epikote 1001" were melt mixed together in a high speed shear mixer at a temperature of approximately 80–85° C. Next, 20 pbw of a core/shell toughener, available from Rohm & Haas, Lauterbourg, France, under the trade designation "Paraloid EXL 2600" was added to the blend of epoxy resins at 80–85° C. and thoroughly dispersed to provide a uniform mixture. 3 pbw of treated fumed silica, available from Degussa-Huels AG, Rheinfelden, Germany, under the trade designation "Aerosil R202" was then added to the mixture of epoxy resins and core/shell toughener and thoroughly dispersed at 80–85° C. After cooling this mixture to about 60–65° C., 6 pbw of micronized dicyandiamide, available from Air Products, Allentown, Pennsylvania, under the trade designation "Amicure CG-1200" and 3 pbw of a methylene diisocyanate urea cure accelerator, available from CVC Specialty Chemicals, Mapleshade, New Jersey under the trade designation "Omicure 52" were added and thoroughly mixed while applying a vacuum to deaerate the final bondable material. This material was then coated between two silicone-treated polyester release liners using a heated knife-over-bed coating station. Both the knife and bed were heated to approximately 60–65° C. The gap between knife and bed was set to provide a final bondable layer thickness of 508 micrometers (not including any liners).

Pressure sensitive adhesive dots were prepared as described in Example 1 and applied to one surface of the bondable layer.

Example 6

A sample was prepared in accordance with Example 1 with the following modification. A toughened, low density, expandable epoxy resin having a weight of approximately 1600 g/m$^2$, available from 3M, under the trade designation "Scotch-Weld AF 3030 FST Grade 50 Foaming Structural Adhesive Film", was employed as the bondable layer.

Example 7

A sample was prepared in accordance with Example 1 with the following modification. An unsupported, thermosetting adhesive in film form having a weight of 308 g/m$^2$, available from 3M, under the trade designation "Scotch-Weld AF 10 Structural Adhesive Film", was employed as the bondable layer.

Example 8

A sample was prepared in accordance with Example 1 with the following modification. A modified epoxy adhesive film supplied with a random polymer mat carrier, having a weight of 150 g/m² available from Cytec Industries Incorporated, West Patterson, N.J., under the trade designation "Cytec FM 73M Adhesive Film", was employed as the bondable layer.

Example 9

A sample was prepared in accordance with Example 1 with the following modification. A structural adhesive film comprising a phenolic-cured epoxy resin as the bondable layer was prepared and employed in the following manner.

The following materials were weighed into a glass container and mixed at room temperature for a minimum of four hours using a roller mixer, followed by high shear mixing to ensure uniform dispersion of the silica: 72 pbw of n-butyl acrylate monomer (available from BASF, Mt. Olive, N.J.), 28 pbw of n-vinyl caprolactam monomer (available from BASF), 0.25 pbw 2,2-dimethoxy-1,2-diphenylethan-1-one (available from Ciba Geigy, Hawthorne, N.Y., under the trade designation "Irgacure 651"), 40 pbw Epikote 232, 24 pbw of Bisphenol A (available from Shell Chemical, Pernis, The Netherlands), 2 pbw Ni(imidazole)-6-phthalate and, 9 pbw Aerosil R-202. (Ni(imidazole)-6-phthalate can be made by combining 0.2 equivalents of the sodium or potassium salt of phthalic acid in 100 ml of water with 0.1 mole of $(Ni(OAc)_2 \cdot 4H_2O)$ and 0.6 moles of imidazole in 250 ml water at 50° C.) After cooling to 5° C., the Ni(imidazole) 6-phthalate salt precipitates. The material is filtered, washed well with water to remove any remaining imidazole, and then dried.) The mixture was then degassed and flushed with nitrogen prior to casting between two polyester-treated release liners and UV-cured for approximately 1.8 minutes at an intensity of 1.3 mW/cm²) to give a final film thickness (not including liner) of 500 micrometers.

Pressure sensitive adhesive dots were prepared as described in Example 1 and applied to one surface of the bondable layer.

Example 10A

A sample was prepared in accordance with Example 5, with the following modification. A pressure sensitive adhesive, in the form of a blown microfiber, was prepared having a composition of isooctyl acrylate:acrylic acid:2-(polystyryl)ethyl methacrylate macromer (having a molecular weight of 13,000), available from Sartomer Company, Exton, Pennsylvania under the trade designation "CHEM-LINK 4500" in a ratio of 92:4:4 (weight/weight). The pressure sensitive adhesive composition was prepared in a blown microfiber (BMF) form as described in U.S. Pat. No. 4,693,776, incorporated herein by reference.

The BMF pressure sensitive adhesive was coated onto silicone-treated paper liner at a coating weight of 5 g/m², using a die tip having 0.38 millimeter diameter holes at a spacing of 10 holes per inch (10 holes per 2.54 centimeter). Heated air, at a temperature of 270° C., attenuated the fibers out of the die tip at a rate of 125 SCFM (standard cubic feet per minute). The air knife configuration consisted of a 0.25 mm positive set back and a 0.76 millimeter air gap. The polymer output rate and the die-to-collector distance were held constant at 0.45 kilograms pounds per hour and 18.4 cm, respectively. A moderate vacuum was pulled through a medium mesh collector screen at the point of web formation. The collector speed was set at 27.4 meters/minute (90 feet/minute) in order to collect a 5 g/m² weight sample. The temperature profile along the extruder was constant at 200° C., with the neck tube set to 185° C., and the die set to 220° C. After applying the BMF pressure sensitive adhesive to the release liner, it was transfer laminated to the bondable layer of Example 5, using the method described in Example 1.

Example 10B

A sample was prepared in accordance with Example 10A with the following modification. The pressure sensitive adhesive composition was not prepared as melt-blown microfibers, but rather was dissolved at 45 weight percent solids in ethyl acetate. The pressure sensitive adhesive solution was coated onto a silicone-treated polyester release liner using a knife-over-bed coating station having a gap setting sufficient to provide an adhesive thickness of 12.7 micrometers (not including the release liner) after drying at 70° C. for 30 minutes. The dried sheet of continuous pressure sensitive adhesive film obtained was transfer laminated, at room temperature using two nip rollers, to a bondable layer as described in Example 10A.

Example 11

A sample was prepared in accordance with Example 5 with the following modification. A water-based pressure sensitive acrylic adhesive, available from 3M under the trade designation "Scotch-Grip 4224-NF" was applied directly to the bondable layer using a micropipet to give the grid-like pattern described in Example 1. The pressure sensitive adhesive was dried at 23° C. overnight followed by 3 hours at 70° C. in a forced air oven. The resulting dots of pressure sensitive adhesive had a diameter of approximately 2 millimeters and a thickness of 12 to 25 micrometers.

Example 12

A sample was prepared in accordance with Example 5 with the following modification. An adhesive transfer tape available from 3M under the trade designation "Laminating Adhesive 671LE" was laminated onto a silicone-treated paper liner, cut into small square pieces measuring 2.5 mm×2.5 mm, and applied by hand to the bondable layer to give the grid-like pattern described in Example 1. The second liner was removed to expose the pressure sensitive adhesive surface. The resulting dots of pressure sensitive adhesive had a thickness of approximately 60 micrometers.

Example 13

A sample was prepared in accordance with Example 5 with the following modification. A high tack, synthetic rubber resin, available from 3M under the trade designation "475XL Double Coated Film Tape" was laminated onto a silicone-treated paper liner, cut into small square pieces measuring 2.5 mm×2.5 mm, and applied by hand to the bondable layer to give the grid-like pattern described in Example 1. The second liner was removed to expose the pressure sensitive adhesive surface. The resulting dots of pressure sensitive adhesive had a thickness of approximately 150 micrometers.

Example 14

A sample was prepared in accordance with Example 5 with the following modification. A soft rubber resin pressure sensitive adhesive, available from 3M under the trade designation "464XL Extended Liner Tape" was laminated onto a silicone-treated paper liner, cut into small square pieces measuring 2.5 mm×2.5 mm, and applied by hand to the bondable layer to give the grid-like pattern described in Example 1. The second liner was removed to expose the pressure sensitive adhesive surface. The resulting dots of pressure sensitive adhesive had a thickness of approximately 80 micrometers.

Example 15

A sample was prepared in accordance with Example 5 with the following modification. 6 parts by weight of a corrosion inhibitor available from W. R. Grace GmbH, Worms, Germany under the trade designation "Shieldex AC5" was added to the material for preparing the bondable layer during the mixing step prior to coating. Prior to the lamination of the dots onto the bondable layer, a scrim (12 g/m² polyester tissue available from Technical Fibre Products, Slate Hill, N.Y.) was laminated into the bondable layer by feeding the scrim into the rolling bank of bondable material prior to the first nip roller.

Example 16

A sample was prepared in accordance with Example 5 with the following modification. The pressure sensitive adhesive printing method described in Example 1 was used to provide pressure sensitive adhesive dots approximately 1 millimeter in diameter in a repeating, uniform grid-like pattern having columns (y-direction) and rows (x-direction). The dots had a center-to-center distance of 5 mm in the y-direction and a center-to-center distance of 10 mm in the x-direction between every other column. Adjacent columns of dots were offset by 2.5 mm in the y-direction from each other and, in the x-direction, were spaced equidistant from the closest columns on either side.

Example 17

A sample was prepared in accordance with Example 5, with the following modification. 15 pbw of core/shell toughener was used.

Example 18

A sample was prepared in accordance with Example 15, with the following modification. No scrim was laminated onto the bondable layer.

Example 19

A sample was prepared in accordance with Example 1, with the following modification. A flexible polyester-based thermoplastic adhesive bonding film, having a thickness of approximately 100 micrometers, available from 3M under the trade designation "Thermno-Bond Film 615", was used as the bondable layer.

Example 20

A sample was prepared in accordance with Example 10, with the following modification. A flexible polyamide-based thermoplastic adhesive bonding film, having a thickness of approximately 100 micrometers, available from 3M under the trade designation "Thermo-Bond Film 770", was used as the bondable layer.

Example 21

A rubber-based pressure sensitive adhesive was prepared by milling together 100 pbw comminuted natural rubber, 10 pbw accelerator (available from Eagle Zinc Co., Hillsboro, Ill, under the trade designation "318T zinc oxide"), and 1.5 pbw each of an antioxidant, dilauryl thiodipropionate (available from Cytec Industries Inc., Bound Brook, N.J., under the trade designation "Cyanox LTDP") and an antioxidant (available from Goodyear Tire & Rubber, Akron, Ohio., under the trade designation "Wingstay L"). 35 pbw tackifier (available from Exxon Chemical, Baton Rouge, La., under the trade designation "Escorez 1304 Hydrocarbon Resin"), 30 pbw thermosetting phenolic resin (available from Schenectady Chemicals, Schenectady, N.Y., under the trade designation "HRJ-10518"), 10 pbw zinc resinate (available from Ascona, Buenos Aires, Argentina, under the trade designation "ZN-89"), and toluene in an amount sufficient to provide a 25% (by weight) solids mixture were added to the above milled mixture in an agitated mixing vessel.

The resultant pressure sensitive adhesive was coated, using a standard notch bar coating technique, onto a 76.2 micrometer (0.003 inch) thick silicone-treated paper release liner and dried at 65° C. for 5–10 minutes in a circulating air oven to provide a dried pressure sensitive adhesive coating having a thickness of 25–37 micrometers (0.001–0.001 5 inches). The pressure sensitive adhesive-coated silicone release liner was laminated to a bondable layer, available from Dyno Overlays Inc, High Point, N.C., under the trade designation "Phenolic Glue Film" having a nominal thickness of 127–140 µm) using hand pressure to form a release liner/pressure sensitive adhesive/bondable layer composite.

Comparative Example 1

An adhesive article having a bondable layer of Cytec FM 73M (having a weight of 300 g/m²) and a continuous pressure sensitive adhesive film on both major surfaces of the bondable layer was prepared. The pressure sensitive adhesive composition was 2-ethyl hexyl acrylate:methyl acrylate:glycidyl methacrylate:N-vinyl-2-pyrrolidone:acrylic acid/67:23:0.5:2:7 and was prepared in the following manner.

A monomer mixture was made by mixing 423 g of 2-ethyl hexyl acrylate, 145 g of methyl acrylate, 3.15 g of glycidyl methacrylate, 12.6 g of N-vinyl-2-pyrrolidone and 44.1 g of acrylic acid. 157 g of this mixture was introduced to a 2 liter reactor equipped with a half-moon shaped agitator made of commercially available material under the trade designation "Teflon", a reflux condensor and a thermistor. 73.5 g of ethyl acetate and 78.8 g of hexane were added. The contents of the reactor were heated to reflux and 0.238 g of 2,2'-azobis-2-methylpropanenitrile, available from DuPont Company, Chemicals & Pigments Department, Wilmington, Dela. under the trade designation "Vazo 64" in 5.0 g of ethyl acetate was added. Vigorous reflux was started within a short time and the contents of the reactor were held at reflux for 23 minutes. Then, the remaining monomer mixture was combined with 537 g of ethyl acetate, 75.2 g of hexane and 0.707 g of Vazo 64 and added as a single feed mixture over a period of 3.5 hrs. Throughout the feed time the reactor contents were maintained at reflux. One hour after the end of the feed, with the reflux maintained, 0.17 g Vazo 64 in 5 g ethyl acetate was added to the reaction mixture and the reactor contents were held at reflux for an additional hour. Upon completing the reflux, the contents were then cooled and a 44.1%. solids (weight/weight) adhesive solution was obtained.

The pressure sensitive adhesive solution was coated onto a silicone-treated polyester release liner using a knife-over-bed coating station having a gap setting sufficient to provide an adhesive thickness of 12.7 micrometers (not including the release liner) after drying at 70° C. for 30 minutes. The dried sheet of continuous pressure sensitive adhesive film thus obtained was transfer laminated, at room temperature using two nip rollers, to a bondable layer of Cytec FM-73 having a nominal thickness of 500 micrometers.

Comparative Example 2

A sample was prepared in accordance with Comparative Example 1 with the following modification. A pressure sensitive adhesive composition of isooctyl acrylate:methyl acrylate:glycidyl methacrylate:N-vinyl caprolactam:acrylic acid/72:16:1:4:7 was used and was prepared in the following manner.

A monomer mixture was made by mixing 453.6 g of isooctyl acrylate, 100.8 g of methyl acrylate, 6.3 g of glycidyl methacrylate, 25.2 g of N-vinyl caprolactam, 44.1 g of acrylic acid and 0.94 g of Vazo 64. 157.5 g of this monomer mixture, 78.8 g of hexane, and 78.8 g of ethyl acetate were introduced to a 2 liter reaction vessel equipped with a half-moon shaped agitator made of commercially available material under the trade designation "Teflon", a reflux condenser and a thermistor. The contents of the vessel were heated to reflux. After refluxing the reactor contents vigorously for about 12 minutes the remaining monomer mixture was added along with 537 g of ethyl acetate and 75.2 g of hexane as a single feed over a period of 3 hours. Throughout the feed time the reactor contents were maintained at reflux. Upon completing the feed, refluxing was continued for an additional two hours. The contents were then cooled and a 41.4% solids (weight/weight) adhesive solution was obtained.

The pressure sensitive adhesive solution was coated onto a silicone-treated polyester release liner using a knife-over-bed coating station having a gap setting sufficient to provide an adhesive thickness of 12.7 micrometers (not including the release liner) after drying at 70° C. for 30 minutes. The dried sheet of continuous pressure sensitive adhesive film thus obtained was transfer laminated, at room temperature using two nip rollers, to a bondable layer of Cytec FM 73M having a nominal thickness of 500 micrometers.

Comparative Example 3

A pressure sensitive adhesive layer was prepared as described in Comparative Example 1. A bondable layer was prepared as described in Example 5. Lamination of the pressure sensitive adhesive layer and the bondable layer was performed as described in Comparative Example 1.

Comparative Example 4

A sample was prepared in accordance with Comparative Example 1 with the following modification. The pressure sensitive adhesive layer was coated to give a dry thickness of 75 micrometers.

Comparative Example 5

A sample was prepared in accordance with Comparative Example 2 with the following modification. The pressure sensitive adhesive layer was coated to give a dry thickness of 75 micrometers.

Control A

A pressure sensitive adhesive layer was prepared from the composition described in Example 1. Rather than being screen printed as dots, the pressure sensitive adhesive composition was coated using the method described in Comparative Example 1, to yield as dry film with a thickness of approximately 12.7 micrometers. The film was not laminated to a bondable layer.

Control B

A pressure sensitive adhesive layer was made as described Control A, but prior to coating the film, 10 weight percent of epoxide commercially available from Shell Chemical, Houston, Tex. under the trade designation "EPON 828", calculated as a fraction of the solids portion of the pressure sensitive adhesive composition, was blended into the pressure sensitive adhesive layer. The mixed composition was cast by hand onto silicone-treated release liner to yield a dry film thickness of approximately 50 micrometers. The film was not laminated to a bondable layer.

Control C

A pressure sensitive adhesive layer was made as in Comparative Example 1, but prior to coating the film, 10 weight percent EPON 828, calculated as a fraction of the solids portion of the pressure sensitive adhesive composition, was blended into the pressure sensitive adhesive layer in order to generally represent what occurs when the pressure sensitive adhesive layer. The mixed composition was cast by hand onto silicone-treated release liner to yield a dry film thickness of approximately 50 micrometers. The film was not laminated to a bondable layer.

Control D

A pressure sensitive adhesive layer was made in accordance with Comparative Example 1 with the following exceptions. The film was coated and dried to provide an adhesive thickness of approximately 75 micrometers. The film was not laminated to a bondable layer.

Control E

A pressure sensitive adhesive layer was made in accordance with Comparative Example 2 with the following exceptions. The adhesive solution was coated and dried to provide a dry film thickness of approximately 75 micrometers. The film was not laminated to a bondable layer.

Control F

A pressure sensitive adhesive layer was made in accordance with Example 10B and was not laminated to a bondable layer.

Control G

A bondable layer was prepared as described in Example 5. A pressure sensitive adhesive layer was not laminated to the bondable layer.

Control H

A bondable layer was prepared as described in Example 8. A pressure sensitive adhesive layer was not laminated to the bondable layer.

Control I

A pressure sensitive adhesive layer in accordance with Example 21 was prepared but was not laminated to a bondable layer.

Results

The following tables contain the results of testing the examples in accordance with one or more Test Methods.

TABLE 1

Overlap Shear, Floating Roller Peel & Impact Resistance

| Example | Overlap Shear After Heat Bonding (MPa) @ R.T. | Overlap Shear After Heat Bonding (MPa) @ 80° C. | Overlap Shear After Heat Bonding (MPa) After Hot/Wet Aging | Floating Roller Peel Adhesion After Heat Bonding (N/25 mm) @ 23 +/− 3° C. | Floating Roller Peel Adhesion After Heat Bonding (N/25 mm) @ 80° C. | Impact Resistance After Heat Bonding (kJ/m$^2$) @ R.T. | Impact Resistance After Heat Bonding (kJ/m$^2$) @ −40° C. |
|---|---|---|---|---|---|---|---|
| 1 | 32 | 24 | 29 | 216 | * | 24 | * |
| 2 | 31 | * | * | 161 | * | * | * |
| 3 | 27 | 15 | * | 198 | * | * | * |
| 4 | 26 | * | * | 98 | * | * | * |
| 5 | 33 | 29 | 34 | 168 | 220 | 46 | 33 |
| 6 | 3.3 | * | * | ** | ** | * | * |
| 7 | 11.8 | * | * | 86 | * | * | * |
| 8 | 25 | 20 | 21 | 196 | * | 27 | * |
| 9 | 12.1 | 1.9 | * | 198 | * | 21 | * |
| 10A | 15 | * | * | * | * | * | * |
| 10B | 1.7 | | | | | | |
| 11 | 42 | * | * | * | * | * | * |
| 12 | 39 | * | * | * | * | * | * |
| 13 | 33 | * | * | * | * | * | * |
| 14 | 30 | * | * | * | * | * | * |
| 15 | 33 | 30.5 | 27 | 188 | 236 | 45 | * |
| 16 | 38 | * | * | * | * | * | * |
| 19 | 3.4 | * | * | * | * | * | * |
| 20 | 2.7 | * | * | * | * | * | * |

* = Not tested
** = Was not tested because bondable layer intentionally foams during the heat bonding cycle

TABLE 2

Storage Stability of Example 17
(20–30° C. and 30–80% RH)

| Storage Time (months) | Aging Stability (% conversion) | Overlap Shear After Heat Bonding (MPa) | Floating Roller Peel Adhesion After Heat Bonding (N/25 mm) |
|---|---|---|---|
| 0 | 0 | 35.6 | 175 |
| 1 | 0 | 34.3 | 222 |
| 3 | 4 | 30.4 | 199 |
| 5 | 3 | 32.7 | 201 |
| 9 | 7 | 31.4 | 183 |
| 12 | 8 | 29.9 | 225 |
| 14 | 8 | 31.7 | 212 |

TABLE 3

Storage Stability of Example 17
(38 to 42° C. in sealed container in water bath)

| Storage Time (months) | Aging Stability (% conversion) | Overlap Shear After Heat Bonding (MPa) | Floating Roller Peel Adhesion After Heat Bonding (N/25 mm) |
|---|---|---|---|
| 0 | 0 | 35.6 | 175 |
| 0.23 | 1 | 32.4 | 192 |
| 0.46 | 4 | * | * |
| 0.70 | 8 | 30.4 | * |
| 0.93 | 13 | 29.8 | 202 |

*Not tested

TABLE 4

Pressure Sensitive Adhesive Characteristics

| Example | Sugar Tack of Bondable Samples After Storage @ R.T. For 3 Months | FTIR Ratio of Bondable Samples after Storage @ RT for 3 Months (1510 cm$^{-1}$/1732 cm$^{-1}$) | Finger Tack of PSA layer of Bonded Sample[3] | Pencil Hardness of PSA layer of Adhesive Article After Heat Bonding[4] |
|---|---|---|---|---|
| 5 | 4T, 4B | 0.086[1] | Very Tacky | softer than 6B |
| 10A | 4T, 4B | ** | Slightly Tacky | * |
| 10B[2] | 4T, 4B | 0.047 | Slightly Tacky | F/H |
| 11 | * | * | Tacky | * |
| 12 | * | * | Tacky | * |

TABLE 4-continued

Pressure Sensitive Adhesive Characteristics

| Example | Sugar Tack of Bondable Samples After Storage @ R.T. For 3 Months | FTIR Ratio of Bondable Samples after Storage @ RT for 3 Months (1510 cm$^{-1}$/1732 cm$^{-1}$) | Finger Tack of PSA layer of Bonded Sample[3] | Pencil Hardness of PSA layer of Adhesive Article After Heat Bonding[4] |
|---|---|---|---|---|
| 13 | * | * | Very Tacky | * |
| 14 | * | * | Tacky | * |
| C.E. 1 | 1T, 1B | 0.268 | No Tack | 2H/3H |
| C.E. 2 | 1T, 1B | 0.274 | No Tack | 2H/3H |
| C.E. 3 | 3T, 1B | 0.099 | No Tack | * |
| C.E. 4 | 4T, 2B | * | No Tack | * |
| C.E. 5 | 4T, 2B | * | No Tack | * |
| Control A | 4T, 4B | N/A | Very Tacky | softer than 6B |
| Control D | 4T, 4B | N/A | Very Tacky | softer than 6B |
| Control E | 4T, 4B | N/A | Very Tacky | softer than 6B |
| Control F | 4T, 4B | N/A | Very Tacky | softer than 6B |
| Control G | N/A | N/A | No Tack | 3H |
| Control H | N/A | N/A | No Tack | 3H |

\* = Not tested
\*\* = Not testable
[1]FTIR Measurement made on a dot.

Example 5 was also tested after more than three months of storage in accordance with the 90 Degree Peel Test Method (1 minute dwell) and provided a result of 18 N/25 mm.

TABLE 5

Sugar Tack

| Example | Sugar Tack of Pressure-Sensitive Adhesive After IPA Exposure | Sugar Tack of Pressure-Sensitive Adhesive After Amine/IPA Exposure |
|---|---|---|
| Control A | 4T, 4B | 4T, 4B |
| Control B | 4T, 4B | 4T, 1B |
| Control C | 4T, 4B | 1T, 1B |
| Control D | 4T, 4B | 4T, 4B |

TABLE 6

Sugar Tack Test For Control I and Example 21

| | Sugar Tack | | |
|---|---|---|---|
| Example | Aging Conditions of 25° C. for 30 days | Aging Conditions of 66° C. for 48 hours | Aging Conditions of 66° C. for 120 hours |
| Control I | 4T, 4B | 4T, 4B | 4T, 4B |
| Example 21 | 4T, 4B | 4T, 4B | 4T, 4B |

TABLE 7

FTIR Ratio of C.E. 1 (not bonded, aged at 23 +/− 3° C.)

| Time | FTIR Ratio (1510 cm$^{-1}$/1732 cm$^{-1}$) |
|---|---|
| 1 hour | 0 |
| 3 days | 0.05 |
| 6 days | 0.16 |
| 4 months | 0.268 |

TABLE 8

Storage of Bondable Samples[1]

| Example | Storage Time (days) | Floating Roller Peel Adhesion After Heat Bonding (N/25 mm) |
|---|---|---|
| 18 | 0 | 206 |
| 18 | 1 | 171 |
| 15 | ~7 | 193 |

[1]at RT and 50 +/− 5% RH (initially dried for 1 day at RT and <5% RH)

The difference between the samples of Examples 15 and 18 is the inclusion of scrim. The presence or absence of scrim does not have any measurable effect on the floating roller peel adhesion, impact resistance, overlap shear strength.

TABLE 9

Overlap Shear and Manual Peel Strength for Example 21

| Example | Overlap Shear (Veneer) | Manual Peel Strength (Veneer) |
|---|---|---|
| 21 | 1.9 MPa | Splitting of veneer, internal failure[1] |

[1]Indicative of a structural bond

What is claimed is:
1. An adhesive article comprising a bondable layer having on at least one major surface a layer of pressure sensitive adhesive,
   wherein the bondable layer comprises a thermosetting material,
   the pressure sensitive adhesive layer being substantially incompatible with the bondable layer both prior to and after curing of the bondable layer, and wherein the pressure sensitive layer substantially retains pressure sensitive adhesive characteristics after storage at room temperature for at least about three months prior to bonding the adhesive article, and
   the adhesive article has a overlap shear measured at room temperature according to ASTM D-1002-94 of at least about 6.9 MPa after bonding.

2. An assembly comprising a substrate and an adhesive article of claim 1, wherein the substrate is in contact with the pressure sensitive adhesive layer of the adhesive article.

3. An assembly of claim 2 further comprising another substrate in contact with the bondable layer of the adhesive article.

4. An adhesive article comprising a bondable layer having on at least one major surface a discontinuous layer of pressure sensitive adhesive, wherein the bondable layer comprises a fusible epoxide prepolymer which is a solid at room temperature, the pressure sensitive adhesive layer being substantially incompatible with the bondable layer both prior to and after curing of the bondable layer.

5. An adhesive article comprising a bondable layer having on at least one major surface a continuous layer of pressure sensitive adhesive, wherein the bondable layer comprises a thermosetting material, the pressure sensitive adhesive layer substantially retains pressure sensitive adhesive characteristics after storage at room temperature for at least about three months prior to bonding the adhesive article, the pressure sensitive adhesive layer being substantially incompatible with the bondable layer both prior to and after curing of the bondable layer.

6. The adhesive article of claim 5 wherein the pressure sensitive adhesive layer comprises a rubber-based pressure sensitive adhesive and a phenolic resin crosslinking agent.

7. A method of making an adhesive article comprising:

(a) selecting a thermosetting bondable material, (b) forming a bondable layer from the thermosetting bondable material, (c) selecting a pressure sensitive adhesive that substantially retains pressure sensitive adhesive characteristics when in contact with the bondable layer after storage at room temperature for at least about three months prior to bonding the adhesive article, and (d) providing a discontinuous layer of the pressure sensitive adhesive on a major surface of the bondable layer, the pressure sensitive adhesive layer being substantially incompatible with the bondable layer both prior to and after curing of the bondable layer, wherein the adhesive article has a overlap shear measured at room temperature according to ASTM D 1002-94 of at least about 6.9 MPa after bonding.

8. A method of making an adhesive article comprising:

(a) selecting a thermosetting bondable material, (b) forming a bondable layer from the thermosetting bondable material, (c) selecting a pressure sensitive adhesive that substantially retains pressure sensitive adhesive characteristics when in contact with the bondable layer after storage at room temperature for at least about three months prior to bonding the adhesive article, and (d) providing a continuous layer of the pressure sensitive adhesive on a major surface of the bondable layer, the pressure sensitive adhesive layer being substantially incompatible with the bonding layer both prior to and after curing of the bondable layer.

* * * * *

UNITED STATES PATENT AND TRADEMARK OFFICE
CERTIFICATE OF CORRECTION

PATENT NO.       : 6,565,969 B1
APPLICATION NO.  : 09/422610
DATED            : May 20, 2003
INVENTOR(S)      : Lamon, Alain H.

It is certified that error appears in the above-identified patent and that said Letters Patent is hereby corrected as shown below:

<u>Column 5</u>
Line 55, delete "$T_1$" and insert in place thereof - - $Tg_1$ - -.

<u>Column 12</u>
Line 33, delete "thermnoplastic" and insert in place thereof - - thermoplastic - -.

<u>Column 18</u>
Line 44, following "term" delete "A".

Line 56, delete "auryl" and insert in place thereof - - lauryl - -.

Line 58, delete "sec-utyl" and insert in place thereof - - sec-butyl - -.

Line 59, delete "sed" and insert in place thereof - - used - -.

Line 61, delete "crylate" and insert in place thereof - - acrylate - -.

Line 63, insert - - ( - - before "meth)acrylic".

Line 64, delete "ther" and insert in place thereof - - ether - -.

Line 65-66, delete "onofunctional" and insert in place thereof - - monofunctional - -.

<u>Column 21</u>
Line 12, delete "$C_6$-$C_2$" and insert in place thereof - - $C_6$-$C_{12}$ - -.

UNITED STATES PATENT AND TRADEMARK OFFICE
CERTIFICATE OF CORRECTION

PATENT NO. : 6,565969 B1
APPLICATION NO. : 09/422610
DATED : May 20, 2003
INVENTOR(S) : Lamon, Alain H.

It is certified that error appears in the above-identified patent and that said Letters Patent is hereby corrected as shown below:

<u>Column 21</u>
Line 22, delete "$C_{2-4}$" and insert in place thereof - - $C_2$-$C_4$ - -.

Line 66, following "thereof" delete " , " and insert in place thereof - - ; - -.

<u>Column 22</u>
Line 3, following "quinones" delete - - ; - - and insert in place thereof - - , - -.

<u>Column 31</u>
Line 16, delete "3B2B" and insert in place thereof - - 3B 2B B - -.

<u>Column 33</u>
Line 11, following "1.3 cm" insert in place thereof - - / - -.

<u>Column 37</u>
Line 49, delete "Thermno" and insert in place thereof - - Thermo - -.

Signed and Sealed this

Twenty-second Day of August, 2006

JON W. DUDAS
*Director of the United States Patent and Trademark Office*